US008923708B2

(12) United States Patent
Tanimura

(10) Patent No.: US 8,923,708 B2
(45) Date of Patent: Dec. 30, 2014

(54) SIGNAL PROCESSING DEVICE AND OPTICAL RECEIVING DEVICE

(75) Inventor: Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 954 days.

(21) Appl. No.: 12/707,113

(22) Filed: Feb. 17, 2010

(65) Prior Publication Data

US 2010/0209121 A1 Aug. 19, 2010

(30) Foreign Application Priority Data

Feb. 18, 2009 (JP) .................................. 2009-35807

(51) Int. Cl.
*H04B 10/61* (2013.01)
*H04J 14/06* (2006.01)

(52) U.S. Cl.
CPC ............ *H04B 10/611* (2013.01); *H04B 10/613* (2013.01); *H04B 10/6162* (2013.01); *H04J 14/06* (2013.01)
USPC ........................................................ 398/209

(58) Field of Classification Search
CPC .................. H04B 10/6165; H04B 10/6166
USPC ........................................................ 398/208
See application file for complete search history.

(56) References Cited

U.S. PATENT DOCUMENTS

| 6,917,031 | B1 * | 7/2005 | Sun et al. .................. 250/214 R |
| 7,280,619 | B2 * | 10/2007 | Nemer et al. ................. 375/323 |
| 7,596,323 | B1 * | 9/2009 | Price et al. ..................... 398/141 |
| 7,826,752 | B1 * | 11/2010 | Zanoni et al. .................. 398/205 |
| 2007/0003184 | A1 | 1/2007 | Takahara et al. |
| 2007/0047972 | A1 | 3/2007 | Ikeuchi et al. |
| 2008/0031633 | A1 * | 2/2008 | Hoshida et al. ............... 398/149 |
| 2008/0205905 | A1 | 8/2008 | Tao et al. |
| 2009/0088120 | A1 * | 4/2009 | Ling et al. ..................... 455/314 |
| 2009/0208224 | A1 * | 8/2009 | Kikuchi ......................... 398/141 |
| 2009/0317075 | A1 | 12/2009 | Mandai et al. |
| 2010/0028011 | A1 * | 2/2010 | Kaneda et al. ................ 398/115 |

FOREIGN PATENT DOCUMENTS

| JP | 4-223728 | 8/1992 |
| JP | 11-161275 | 6/1999 |
| JP | 2007-13761 | 1/2007 |
| JP | 2007-60443 | 3/2007 |
| JP | 2010-28795 | 2/2010 |
| WO | 2004/054194 A1 | 6/2004 |
| WO | 2007/045072 | 4/2007 |
| WO | WO 2007/132503 A1 * | 11/2007 | ............. H04B 10/04 |

OTHER PUBLICATIONS

N. Kaneda et al., "Coherent Polarization-Division-Multiplexed QPSK Receiver with Fractionally Spaced CMA for PMD Compensation", IEEE Photonics Technology Letters, vol. 21, No. 4, Feb. 15, 2009.*

(Continued)

*Primary Examiner* — Shi K Li
(74) *Attorney, Agent, or Firm* — Staas & Halsey LLP

(57) ABSTRACT

A signal processing device includes: a phase controller configured to control respective phases of an in-phase signal and an quadrature signal, which are obtained by converting an analog signal into a digital signal when a multi-value phase modulation light is demodulated, by digital signal processing; and a control amount provider configured to provide a control amount to the phase controller based on an output of the phase controller.

14 Claims, 17 Drawing Sheets

(56) References Cited

OTHER PUBLICATIONS

European Office Action dated Jun. 16, 2011 issued in corresponding European Patent Application No. 10 153 825.4.
Laperle C. et al., "WDM Performance and PMD Tolerance of a Coherent 40-Gbit/s Dual-Polarization QPSK Transceiver", Journal of Lightwave Technology, IEEE, New York, NY, vol. 26, No. 1, Jan. 2008, pp. 168-175.
European Search Report dated Jun. 18, 2010 and issued in corresponding European Patent Application 10153825.4.
Japanese Office Action mailed May 21, 2013 in corresponding Japanese Patent Application No. 2009-035807.

* cited by examiner

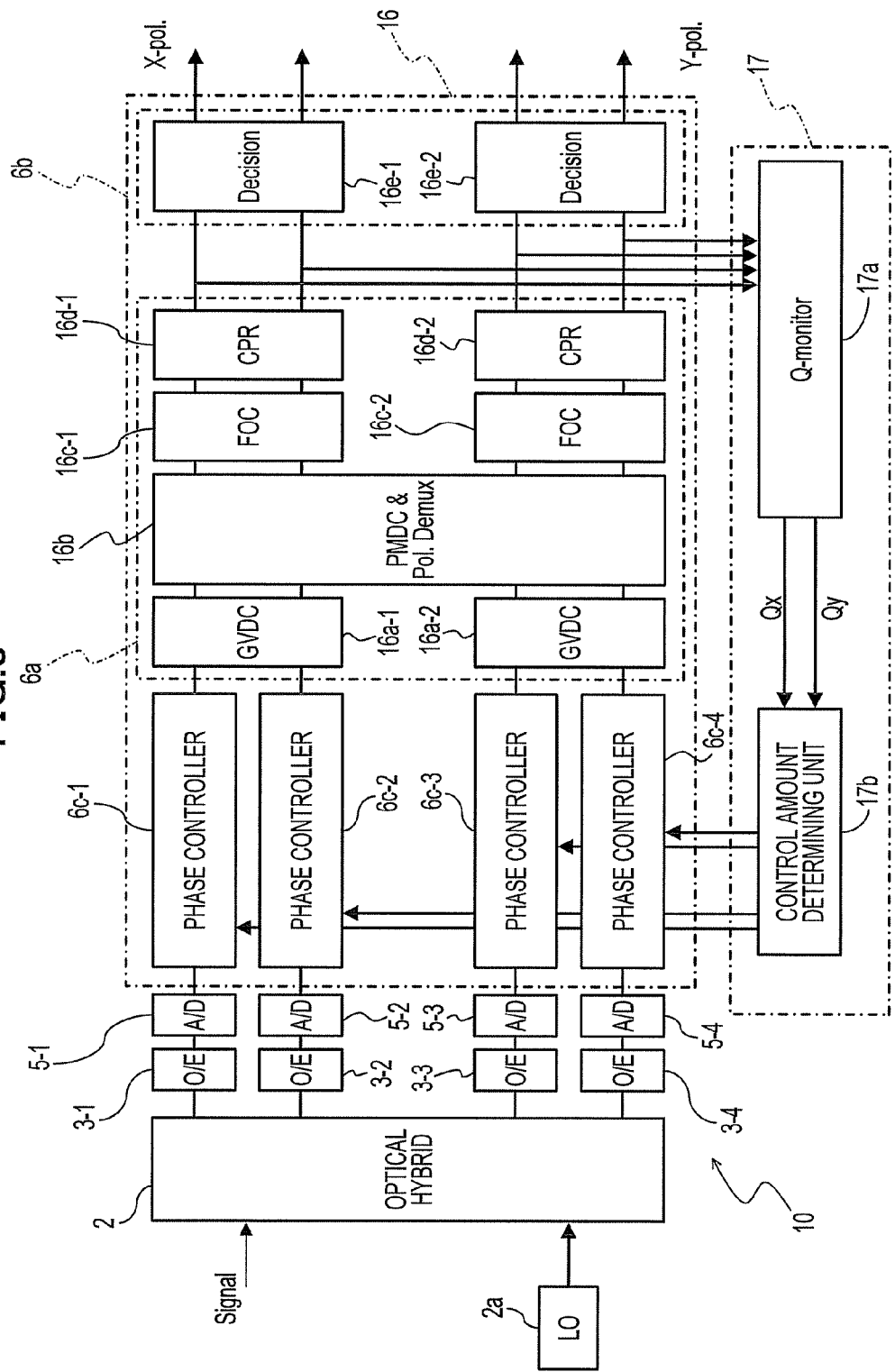

SIGNAL PROCESSING DEVICE AND OPTICAL RECEIVING DEVICE

CROSS-REFERENCE TO RELATED APPLICATIONS

This application is based upon and claims the benefit of priority of the prior Japanese Patent Application No. 2009-035807, filed on Feb. 18, 2009, the contents of which are incorporated herein by reference.

FIELD

The present invention relates to a signal processing device and an optical receiving device.

BACKGROUND

In recent years, there has been a large demand for a next generation optical transmission system with an enlarged transmission capacity as transmission traffic has increased.

To achieve the above-described demand, it is important to employ various modulation methods with superior Spectral Efficiency, Optical Signal Noise Ratio (OSNR) tolerance, and nonlinearity tolerance, rather than Non Return to Zero (NRZ) that has been applied in the conventional system.

Among the above-described methods, a multi-value phase modulation method such as (Differential) Quadrature Phase-Shift Keying: (D) QPSK modulation method is popular as a modulation method of the next generation optical transmission system. The multi-value phase modulation method has features such as High dispersion tolerance, High Polarization Mode Dispersion tolerance, and a narrow spectrum. As a technique for realizing further improvement of the features (OSNR tolerance and chromatic dispersion tolerance) of the multi-value phase modulation method, there is a digital coherent receiving method as a combination of coherent reception and digital signal processing.

A digital coherent receiver includes, for example, an optical front end, which has an optical hybrid and a Local Oscillator Source, and a Digital Signal Processor (DSP) performing digital signal processing.

That is, an optical signal output from the optical front end is converted into an electric signal by a photoelectric converter, is converted into a digital signal by an Analog-to-Digital Converter (ADC), and is then input to the DSP.

The optical signal output from the optical front end is output as an optical signal of each channel (the output signal is output as an I signal and a Q signal. The I signal and the Q signal of each polarization component that is mutually orthogonal is output if polarization multiplexing is applied.). As for the optical signal of each channel, the DSP may receive the signal that is converted into a digital signal.

For example, Japanese Laid-open Patent Publication No. 11-161275 discloses a technique related to the above-described technique.

In the above-described digital coherent receiver, a skew (delay time difference) may be generated between the digital signals of each channel that are input to the DSP. This skew is assumed to be caused by an electric line forming a path of each channel between the optical front end and the DSP and by individual differences of elements of an amplifier or the like. The skew may affect the quality of signals that are to be reproduced by the DSP.

An aspect of the present embodiments is to compensate a skew generated on a path of each channel between the optical front end and the processor performing processing on digital electric signals.

Another aspect of the present embodiments is to increase a margin of the skew with respect to the digital electric signal corresponding to each channel signal input to the DSP to maintain the quality of the signals to be reproduced by the processor.

The present embodiments have not only the above-described aspects but also advantages obtained by each of the configurations or the operations described in the embodiments. Another aspect of the present embodiments is to have advantages that are not obtained from the conventional technique.

SUMMARY

According to an aspect of an embodiment, a signal processing device includes: a phase controller configured to control respective phases of an in-phase signal and an quadrature signal, which are obtained by converting an analog signal into a digital signal when a multi-value phase modulation light is demodulated, by digital signal processing; and a control amount provider configured to provide a control amount to the phase controller based on an output of the phase controller.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF THE DRAWINGS

FIG. 3 illustrates an optical receiving device;

DETAILED DESCRIPTION OF THE PREFERRED EMBODIMENTS

With reference to the diagrams, description will be made below of embodiments of the present invention. The disclosed technique is not limited to the embodiments described below. It should be understood that various changes, substitutions, and alterations, could be made hereto without departing from the spirit and scope of the embodiments.

Figure 1:
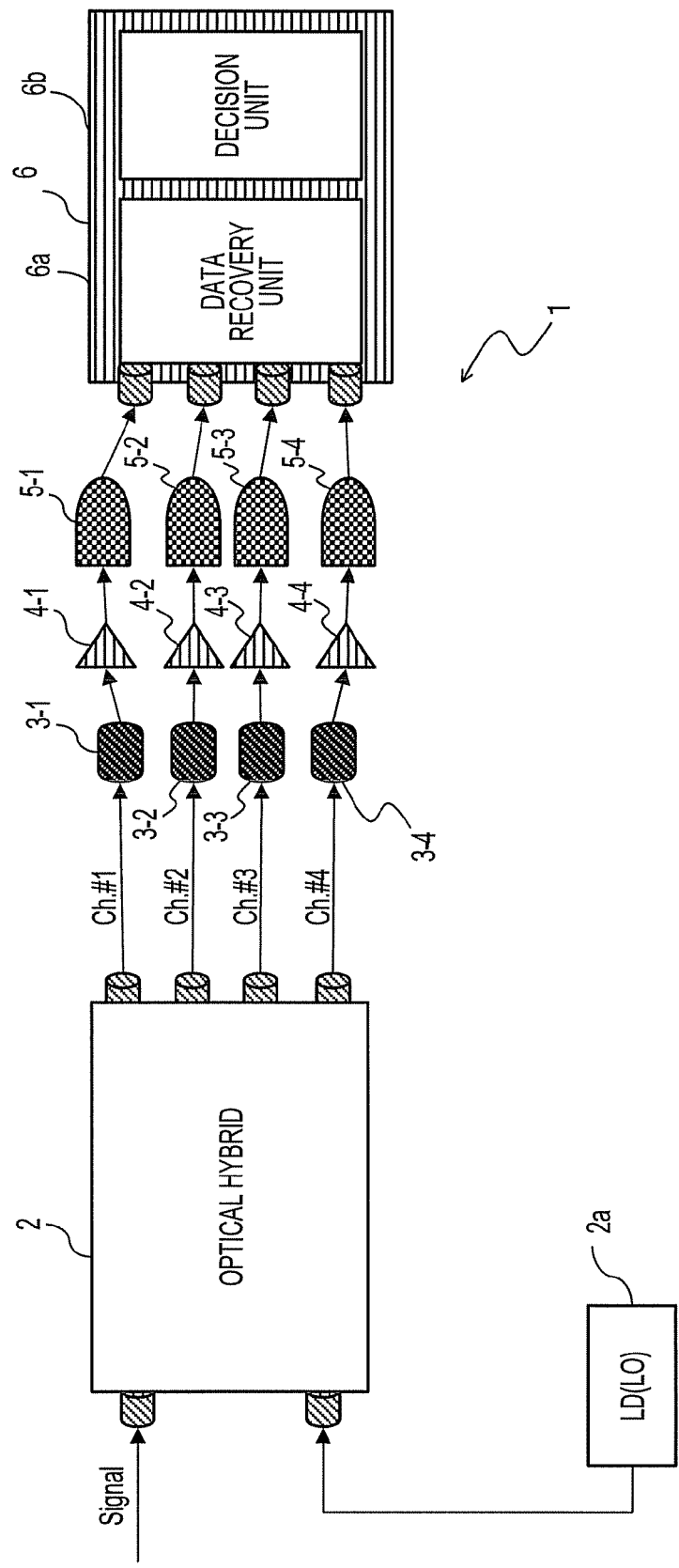
FIG. 1 illustrates an example of a configuration of a coherent optical receiver.

FIG. 1 illustrates a configuration example of an optical receiving device (coherent optical receiver) 1. The optical receiving device 1 illustrated in FIG. 1 may be used in a coherent optical transceiver system. The coherent optical receiver 1 receives a reception signal (optical signal) having data in each of two polarization components that are mutually orthogonal, and reproduces data by using each of the signals that are each converted into electric signals.

Therefore, the coherent optical receiver 1 includes, for example, an optical hybrid 2, a photoelectric converter 3-$i$ ($i$=1 to 4), a Transimpedance Amplifier (TIA) 4-$i$ ($i$=1 to 4), an Analog-to-Digital Converter (ADC) 5-$i$ ($i$=1 to 4), and a DSP (Digital Signal Processor) 6.

The optical hybrid 2 uses a light from a Laser Diode (LD) 2$a$ as a Local Oscillation light (LO light), receives the optical signal having the data in the two polarization components that are mutually orthogonal, and outputs the optical signal as an optical signal of four channels. That is, the optical hybrid 2 is an optical coherent mixer that is used to demodulate an optical multi-value phase modulation light that has received polarization multiplexing.

The optical hybrid 2 illustrated in FIG. 1 outputs an in-phase signal (I signal) and a quadrature signal (Q signal) for each polarization component. The I signal and the Q signal may be associated with channels #1 to #4 illustrated in FIG. 1. For example, the I signal and the Q signal of X polarization component may be associated with the channel #1 and the channel #2 respectively, and the I signal and the Q signal of Y polarization component may be associated with the channel #3 and the channel #4, respectively.

The photoelectric converter 3-$i$ may be, for example, a Photo Detector (PD) that receives the optical signal of the channel #1 and outputs an analog current signal corresponding to a reception light level. For example, if the optical signals of the channel #$i$ output from the optical hybrid 2 are the optical signals whose phases are mutually reversed, a balanced receiver may be used as each photoelectric converter 3-$i$.

The TIA 4-$i$ converts the current signal output from the photoelectric converter 3-$i$ into an analog voltage signal. The ADC 5-$i$ converts the electric signal output from the TIA 4-$i$ into a multi-bit digital signal and leads the digital signal to the DSP 6. An amplifier or the like may be interposed between the TIA 4-$i$ and the ADC 5-$i$.

The DSP 6 is a processor that includes a data recovery unit 6$a$ and a decision unit 6$b$. The data recovery unit 6$a$ compensates signal distortion by performing signal processing with a Finite Impulse Response (FIR) filter or the like on the digital signal output from the ADC 5-$i$ and reproduces the data. The decision unit 6$b$ performs signal point decision by using the data reproduced by the data recovery unit 6$a$.

The compensation processing of the signal distortion by the data recovery unit 6$a$ includes, for example, group delay velocity difference, polarization mode dispersion, frequency offset compensation of optical coherent reception, carrier phase correction, and the like.

The DSP 6 may obtain the same result by using an IIR filter instead of the FIR filter. The FIR filter, the IIR filter, and the like may be collectively referred to as a "filter." The DSP 6 is a processor that may be made up of a logic circuit, an Application Specific Integrated Circuit (ASIC), or the like, or may be made up of a Field Programmable Gate Array (FPGA) or the like depending on a transmission speed of the multi-value phase modulation signal or a processing speed of the signal processing. That is, the processor includes a logic circuit, an ASIC, a FPGA, or the like. In this case, waveform distortion that is to be compensated may be caused by, for example, chromatic dispersion in an optical transmission line, polarization mode dispersion, Self Phase Modulation (SPM), or the like.

According to the above-described configuration, the coherent optical receiver 1 illustrated in FIG. 1 performs optical coherent reception on the optical signals that have received (differential) multi-value phase modulation (for example, (D) QPSK modulation) dependently in two polarization directions that are mutually orthogonal.

That is, the optical hybrid 2 receives the above-described multi-value phase modulation light and then outputs the I signal and the Q signal for each of the polarization components associated with four channels. After receiving the processing by the photoelectric converter 3-$i$, the TIA 4-$i$, and the ADC 5-$i$, the signals are input as digital electric signals corresponding to each channel to the DSP 6.

At this time, a skew (delay time difference) may be generated between the digital signals of each channel to be input to the DSP 6. This skew may be caused by elements 3-$i$ to 5-$i$ forming a signal path of each channel from an output end of the above-described optical hybrid 2 to an input end of the DSP 6 and individual differences of cables or the like connecting the elements thereof. This skew may affect the quality of the data to be reproduced by the DSP 6.

Figure 2A:
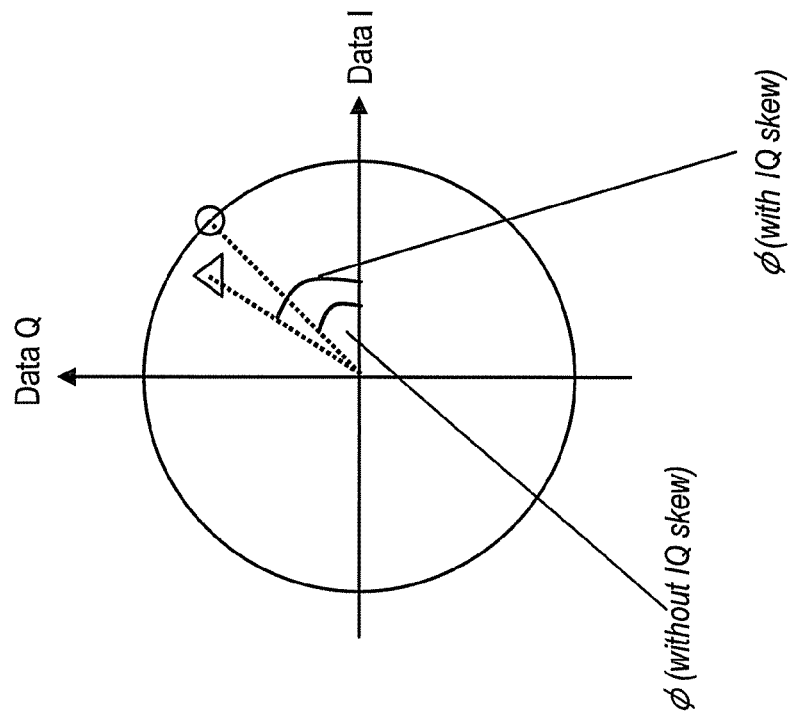
FIG. 2 illustrates a case where a skew generated between an I signal and a Q signal may affect a quality of data to be reproduced.
Figure 2B:
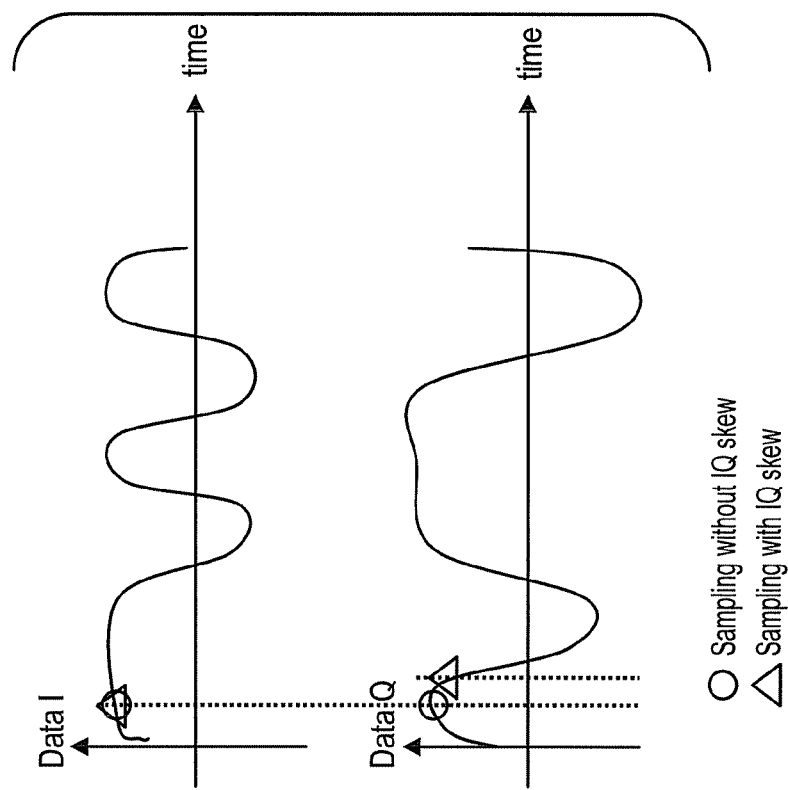

FIG. 2A and FIG. 2B illustrate a case where the skew between the I signal and the Q signal (IQ skew) may affect the quality of the data to be reproduced. For example, if sampling data of the I signal and the Q signal with no skew generated is input from an ADC 5-1 and an ADC 5-2 (see the circular marks in FIG. 2A), a signal point is in the position of the circular marks in FIG. 2B on IQ constellation mapping. In this case, the DSP 6 may obtain the signal point that is located in an optimum position as described in the signal point as the circular mark.

On the other hand, if the sampling data of the I signal and the Q signal with a skew generated is input from the ADC 5-1 and the ADC 5-2 (see the triangular mark in FIG. 2A), the signal point is in the position of the triangular mark in FIG. 2B on the IQ constellation mapping. In this case, in the DSP 6, the position of the signal point is shifted from the optimum position.

As described above, in a method for mapping data to a phase angle and a method for processing by using a digital signal having a phase component in the DSP 6, the existence of the IQ skew affects the phase, so that the quality of the data to be reproduced may be affected. In other words, the skew may affect receiving performance of the coherent optical receiver 1.

In the above-described DSP 6 that does not have a function for compensating the skew of the sampling data, the margin permitted by the skew between the input digital signals of each channel is required to reach a severe level to have the desired quality of the reproduced data.

As illustrated in FIG. 3, an optical receiving device (coherent optical receiver) 10 according to the embodiment has a DSP 16 that includes a phase controller 6$c$-$i$ ($i$=1 to 4) for compensating the skew of the sampling data to be input from the ADC 5-$i$ at a pre-stage of the data recovery unit 6$a$ and particularly at the pre-stage of the GVDC 16$a$. In FIG. 3, the description with a diagram of the TIA 4-$i$ illustrated in FIG. 1 is omitted. The description with a diagram of the TIA 4-$i$ is also omitted in the other embodiments.

That is, as for the corresponding sampling data input from the ADC 5-$i$, the phase controller 6$c$-$i$ compensates the skew of the sampling data by performing the phase control based on the control amount given from a control amount provider 17 described below.

In the data recovery unit 6$a$ illustrated in FIG. 3, each Group Velocity Dispersion Compensators (GVDC) 16$a$-1 and 16$a$-2 is a circuit that compensates optical pulse distortion caused by Group Velocity Dispersion on each polarization component. For example, a numeral with "−1" may indicate a circuit for the X polarization component, and a numeral with "−2" may indicate a circuit for the Y polarization component in FIG. 3.

In the data recovery unit 6$a$, a Polarization-Mode Dispersion Compensator (PMDC) 16$b$ is a circuit that compensates the optical pulse distortion caused by a group delay time difference generated between the two polarized waves mutually orthogonal and that performs polarization wave separation.

In the data recovery unit 6$a$, Frequency Offset Compensators (FOC) 16$c$-1 and 16$c$-2 are circuits that compensate phase rotation of the signal point arrangement and fix the signal point arrangement. In the optical coherent communication, the phase rotation is performed when the frequency of a transmission side laser (signal light) is different from that of a reception side laser (local oscillation light).

In the data recovery unit 6$a$, Career Phase Recovery (CPR) 16$d$-1 and 16$d$-2 are circuits that return a phase deviation of the signal point arrangement, which is generated when the phase of the transmission side laser is different from the phase of the reception side laser in the optical coherent communication, to a regular position.

The decision unit 6$b$ performs the signal point decision based on a value of each channel signal that is data-recovered by the data recovery unit 6$a$ as described above. In the decision unit 6$b$, numeral 16$e$-1 indicates a decision circuit that performs the signal point decision on the X polarization component, and numeral 16$e$-2 indicates another decision circuit that performs the signal point decision on the Y polarization component.

Figure 4:
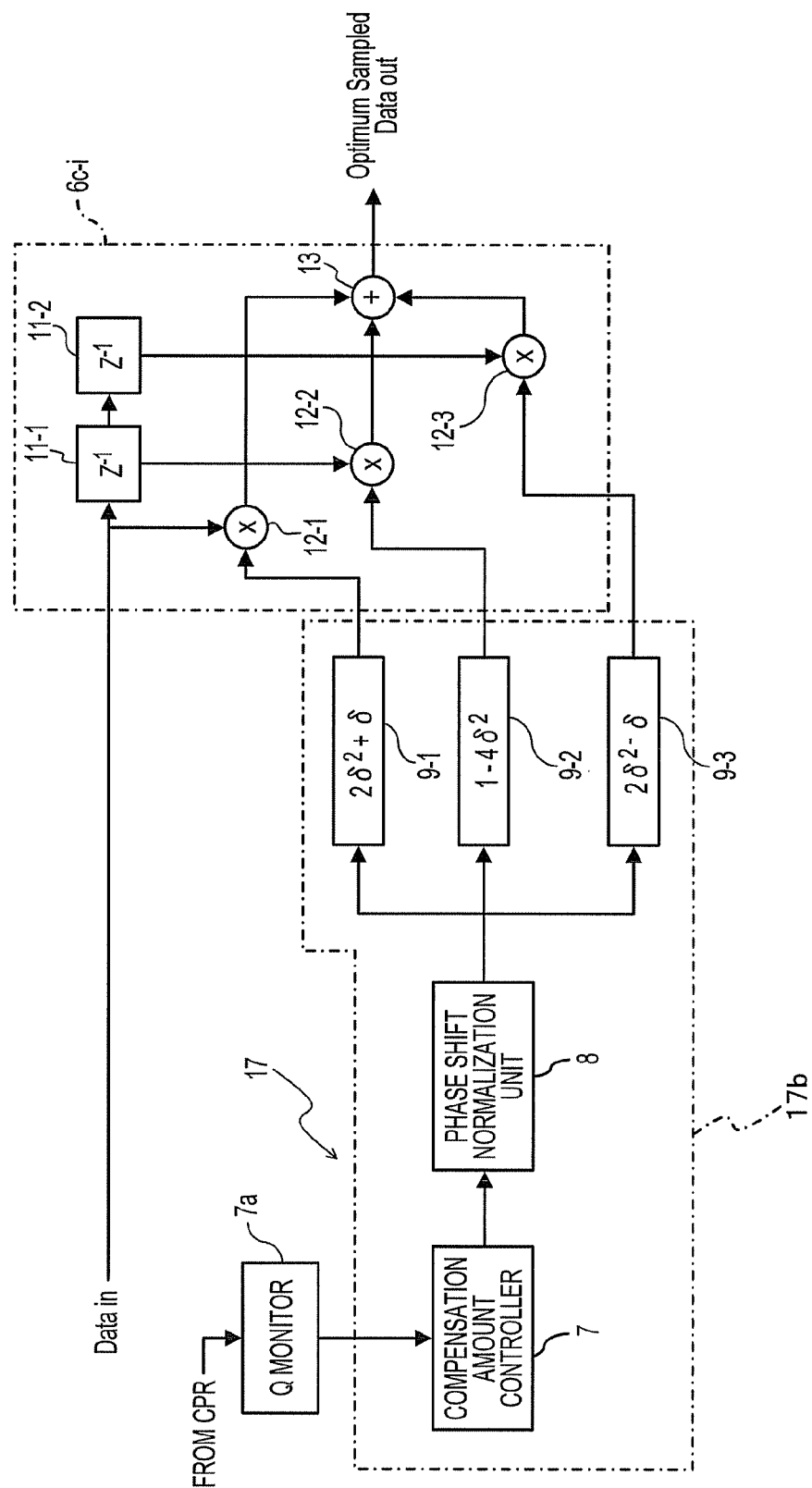
FIG. 4 illustrates an example of a control amount provider in the optical receiving device.

The phase controller 6$c$-$i$ may be a Finite Impulse Response filter (FIR filter) as illustrated in FIG. 4. The FIR filter 6$c$-$i$ illustrated in FIG. 4 is a filter having three taps and gives a multiplication coefficient for each tap to the control amount provider 17.

That is, each phase controller 6$c$-$i$ equivalently includes delay devices 11-1 and 11-2, multipliers 12-1 to 12-3, and an adder 13. The delay device 11-1 delays the sampling data to be input by one tap. The delay device 11-2 further delays the sampling data, which is delayed by one tap by the delay device 11-1, by one tap.

The multiplier 12-1 multiplies the sampling data, which is not delayed by the delay units 11-1 and 11-2, by the coefficient value calculated and set by a coefficient calculator 9-1. On the other hand, the multiplier 12-2 multiplies the sampling data, which is output from the delay unit 11-1, by the coefficient value calculated and set by a coefficient calculator 9-2 described below.

Furthermore, the multiplier 12-3 multiplies the sampling data, which is output from the delay device 11-2, by the coefficient value calculated and set by a coefficient calculator 9-3. The adder 13 adds the multiplication result from three multipliers 12-1 to 12-3 and outputs the multiplication result as sampling data whose phase is controlled (the compensating processing for the skew is performed).

Coefficient calculators 9-1 to 9-3 are elements of the control amount provider 17 as described below. The phase controller 6$c$-$i$ may temporarily store the multiplication value that is calculated and given by the coefficient calculators 9-1 to 9-3.

Based on the output from the phase controller 6$c$-$i$, the control amount provider 17 gives the phase control amount to the phase controller 6$c$-$i$. According to the present embodiment, based on the result from the data recovery performed by the data recovery unit 6$a$ provided on the output side of the phase controller 6-$i$, the control amount provider 17 gives the above-described control amount to the phase controller 6$c$-$i$.

Therefore, the control amount provider 17 includes a Q monitor 17$a$ and a control amount determining unit 17$b$. According to the embodiment, the control amount provider 17 receives the polarization-multiplexed optical signal, so that the Q monitor 17$a$ and the control amount determining unit 17$b$ for compensation of the IQ skew in each polarization component may be provided separately. The control amount provider 17 may be realized in any of hardware, firmware, and software.

For example, two Q monitors 17$a$ may be provided to monitor the Q value (Quality factor) for the X polarization component and the Y polarization component. Four control amount determining units 17$b$ may be provided to correspond to phase controllers 6$c$-1 to 6$c$-4 performing the phase control of each channel. Based on the result of the monitoring of the Q value with respect t to the X and Y polarization components, the IQ skew with respect to the X and Y polarization components may be compensated.

The compensation of the IQ skew with respect to the X polarization component may be achieved by performing both or either of the phase control of the I signal of the X polarization component by the coefficient setting of the phase controller 6$c$-1 and/or the phase control of the Q signal of the X polarization component by the coefficient setting of the phase controller 6$c$-2. The same may be said for the compensation of the IQ skew with respect to the Y polarization component.

In this case, the Q monitor 17$a$ monitors the Q value (the value Qx of the X polarization component, the value Qy of the Y polarization component) for each of the two polarization components from the signal of each channel that is data-recovered by the data recovery unit 6$a$. In other words, the Q monitor 17$a$ is an example of a quality monitor that monitors a quality of the reproduced data based on the output from the data recovery unit 6$a$.

As another example of the quality monitor, for example, a number of error corrections, which is counted in a Forward Error Correction (FEC) circuit provided in the latter part of the decision unit 6$b$, may be used as the above-described quality monitor value. That is, the FEC circuit is another example of the quality monitor.

Based on the Q value from the Q monitor 17$a$, the control amount determining unit 17$b$ determines and sets the phase control amount for the skew compensation to the phase controller 6$c$-$i$. According to the first embodiment, the control amount determining unit 17$b$ receives the polarization-multiplexed optical signal, so that the control amount determining unit 17$b$ may be provided separately for the compensation of the IQ skew in each polarization component.

When focusing on the phase control of one channel signal, as illustrated in FIG. 4, the control amount determining unit 17$b$ includes a compensation amount controller 7, a phase shift normalization unit 8, and coefficient calculators 9-1 to 9-3 for each phase controller 6$c$-$i$ as a setting target of the coefficient.

The compensation amount controller 7 obtains a phase shift amount that is to be compensated based on the Q value from the Q monitor 17a. That is, the Q value from the Q monitor 17a is subtracted to be the phase shift amount (or the phase difference between the I signal and the Q signal) to be compensated. For example, based on the value Qx of the X polarization component, the compensation amount controller 7 obtains the phase shift amount for compensation of the skew with respect to the I signal and the Q signal (the channels #1 and #2, in this time) of the X polarization component. In the same manner, based on the value Qy of the Y polarization component, the compensation amount controller 7 obtains the phase shift amount for the compensation of the skew with respect to the I signal and the Q signal (the channels #3 and #4, in this time) of the Y polarization component.

A relative phase error is compensated to compensate the IQ skew of each of the polarization components. Thus, for example, the compensation amount for the phase control may be given with respect to either the sampling data of the I signal or the Q signal in each polarization component. The compensation amount for the phase control with respect to both the I signal and the Q signal may be obtained.

The compensation amount controller 7 may set the phase shift amount in such a way that the result of the monitoring from the above-described Q monitor 17a is optimum or may produce the phase shift amount by a given calculation or the like based on the result of the monitoring.

A phase shift normalization unit 8 normalizes the phase shift amount that is obtained by the compensation amount controller 7. For example, when sampling is performed in the ADC 5-$i$ in a duration corresponding to a half of one symbol duration, the phase shift amount may be normalized in such a way that 2×(1/sampling rate) becomes a phase shift amount 1. The phase shift normalization unit 8 may be omitted if the compensation amount controller 7 obtains a phase shift amount δ that is normalized as described above.

Figure 5:
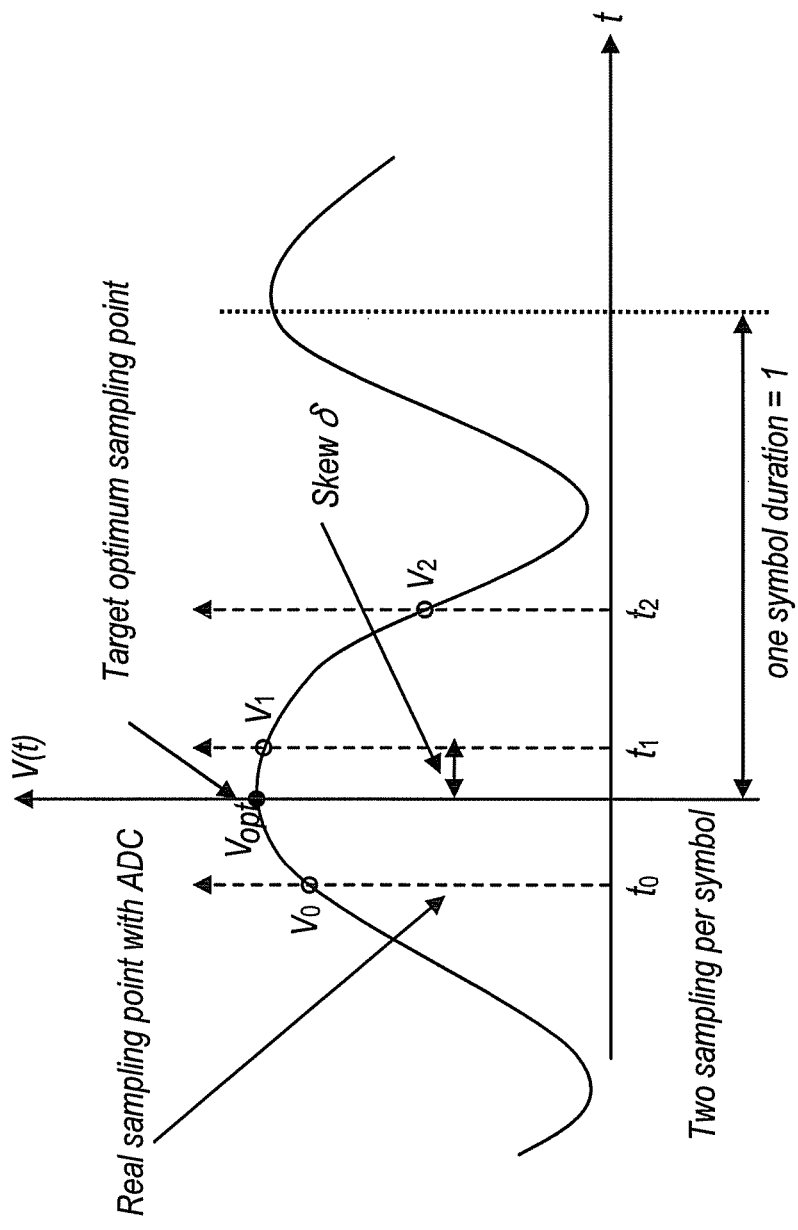
FIG. 5 illustrates compensation of an IQ skew.

By using the phase shift amount δ that is normalized by the phase shift normalization unit 8, coefficient calculators 9-1 to 9-3 derive a filter coefficient to obtain the phase-shifted sampling data. FIG. 5 illustrates a filter coefficient deriving method for calculating by the coefficient calculators 9-1 to 9-3 illustrated in FIG. 4.

As illustrated in FIG. 5, data recovery is assumed to be performed at two sampling points for one symbol by using a complementary equation by a quadratic function. In this case, the period between the sampling points may be a half of the period of one symbol. The curve passing through the consecutive three sampling points may be approximated by the quadratic function $$V = \alpha t^2 + \beta t + \gamma$$

In this case, timings t2, t1, and t0 in the sampling data V2, V1, and V0 may be expressed as in the equations (1) to (3), respectively. Here, δ is a difference between the optimum sampling timing and the sampling timing t1 and indicates a skew amount that is to be compensated.

$$t0 = \delta - \tfrac{1}{2} \quad (1)$$

$$t1 = \delta \quad (2)$$

$$t2 = \delta + \tfrac{1}{2} \quad (3)$$

If the optimum timing is t=0 and the sampling data at that time is Vopt, Vopt=V(0)=γ is obtained by the complementary equations of the above-described quadratic function. If Vopt is expressed as the equation as described in the equation (4) using V0 to V2 and the coefficients C0 to C2, the coefficients C0 to C2 may be expressed as the equations (5) to (7), respectively.

$$Vopt = C0 V0 + C1 V1 + C2 V2 \quad (4)$$

$$C0 = 2\delta^2 + \delta \quad (5)$$

$$C1 = 1 - 4\delta^2 \quad (6)$$

$$C2 = 2\delta^2 - \delta \quad (7)$$

That is, the phase controller 6c-$i$ as the FIR filter having three taps as described in FIG. 4 is given with the coefficients C0 to C3 described in the above-described equations (5) to (7). This makes it possible to obtain a complementary value of the sampling data obtained when the optimum phase shift corresponding to the equation (4) is given. In this case, the coefficients in the equations (5) to (7) may be set by the coefficient setting units 9-1 to 9-3, respectively.

The phase controller 6c-$i$ is made up of the FIR filter having three taps illustrated in FIG. 4 and performs real-time sampling by quadratic function complement at three points: a sample point V2, V1, and V0.

Figure 8:
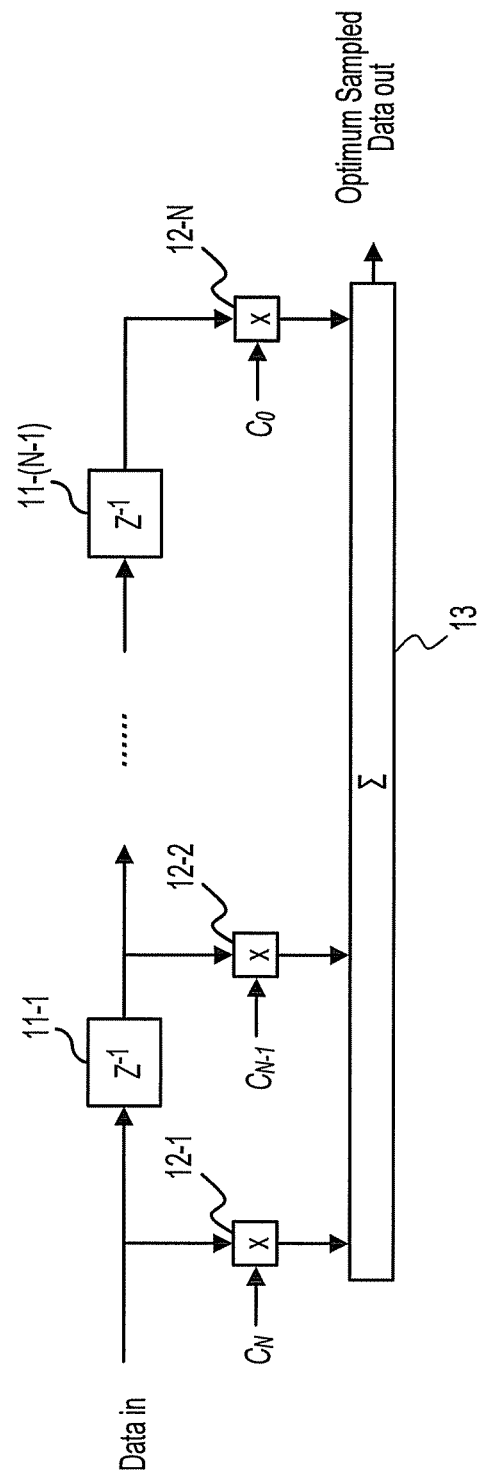
FIG. 8 illustrates a deformation example of a phase controller in the optical receiving device.

The FIR filter making up one of the phase controllers 6c-$i$ may have N taps (N is three or more) as illustrated in FIG. 8. The FIR filter illustrated in FIG. 8 includes a delay device 11-$k$ (k; 1 to N−1), a multiplier 12-$m$ (m; 1 to N), and the adder 13. In this case, by performing complement on the sampling data with an (N−1)-th order function, a complementary value of the sampling data obtained when the optimum skew is obtained may be obtained.

Figure 6:
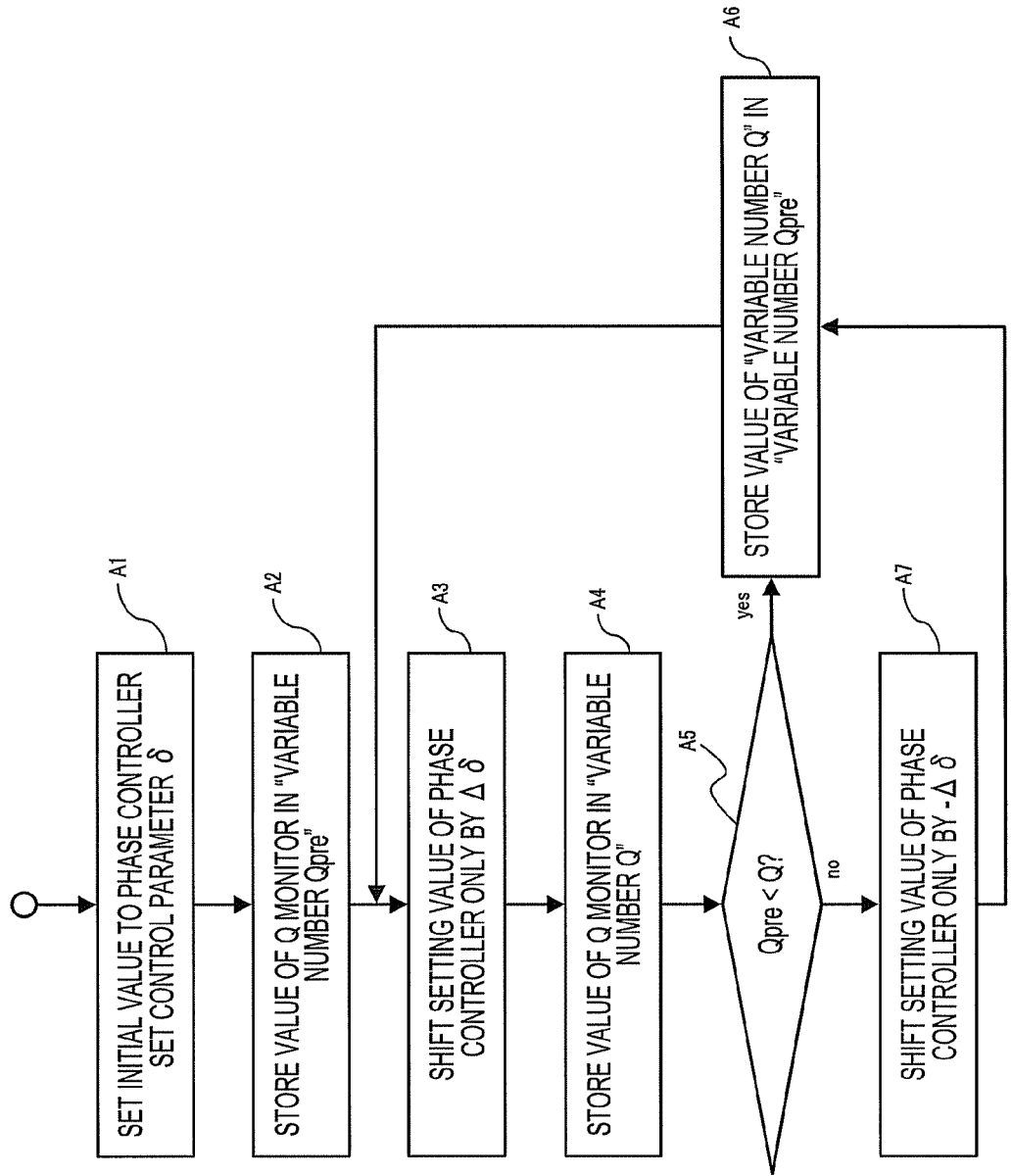
FIG. 6 illustrates operations of the optical receiving device.

The optical receiving device 10 having the above-described configuration performs compensation of the skew between the channels as illustrated in the flowchart in FIG. 6, for example. The control amount determining unit 17b of the control amount provider 17 sets the coefficient of an initial value for each phase controller 6c-$i$. For example, as illustrated in FIG. 4, the compensation amount controller 7 that sets the coefficient of the phase controller 6c-1 and the phase shift normalization unit 8 sets the initial value of δ for coefficient derivation by the coefficient setting units 9-1 to 9-3 (Operation A1).

The amount of δ is an amount of the other phase shifting when either of the I signal or the Q signal is a standard. As a initial value of δ, it is possible to set a value close to the minimum value or the minimum value within a variable range.

After the coefficient of the phase controller 6a-1 is set to the initial value, the Q monitor 17a monitors the Q value (Qx, Qy) at that time and then outputs the result of the monitoring to the compensation amount controller 7 of the control amount determining unit 17b. The compensation amount controller 7 stores the above-described Q value of the result of the monitoring in a storage area of a variable number Qpre (Operation A2).

Next, to set the coefficient of the corresponding phase controller 6c-$i$, the compensation amount controller 7 increases the value of δ, used for the coefficient derivation in the coefficient setting units 9-1 to 9-3, only by Δδ (Operation A3).

When the coefficient of the phase controller 6c-$i$ is changed by the above-described change of the value of δ, the Q monitor 17a monitors the Q value (Qx, Qy) at that time and then outputs the result of the monitoring to the compensation amount controller 7 of the control amount determining unit 17b. The compensation amount controller 7 stores the Q value of the above-described result of the monitoring in a storage area of a variable number Q (Operation A4). The storage area of the variable numbers Qpre and Q may be provided inside or outside the compensation amount controller 7.

The compensation amount controller 7 compares the sizes of the variable numbers Qpre and Q stored in the above-described storage area (Operation A5). Here, if the variable number Q, which is the monitor number value obtained when the value of δ is shifted, is larger than the variable number Qpre as the initial coefficient value (YES in Operation A5), the value of δ is further shifted to continue searching for an optimum value. That is, the value of the variable number Q is updated and stored as the variable number Qpre (Operation A6), and the value of δ for the compensation derivation only by Δδ, and the Q value measurement is performed by the Q monitor 17a (From Operation A6 to Operation A3 and Operation A4).

On the other hand, if the variable value Q, the monitor value obtained when the value of δ is shifted, is equal to or smaller than the above-described value Qpre (NO in Operation A5), the value of δ is close to the optimum value. The value of δ for the coefficient derivation is derived only by −Δδ (by Δδ in the opposite direction to the previous direction) to return to a state with one loop back (Operation A7), and the value from the Q value measurement is stored in the storage area of the Qpre (Operation A6).

Accordingly, the values of δ and Qpre are returned to the state with one loop back. Furthermore, the value of δ is shifted only by Δδ to become the value obtained when the above-described Q is smaller than the Qpre (Operation A3), and the Q value monitored by the Q monitor 17a at that time is stored in the storage area of the Qpre (Operation A4).

Accordingly, if the monitor value Q monitored by the Q monitor 17a is smaller than the above-described Qpre (NO in Operation A5), the values of δ and the variable number Qpre are returned to the previous values (Operation A7 and Operation A6) and then the process returns to the previous loop (Operation A3). The value of δ may be a value stabilizing the Q value close to the optimum value.

When the control is started from a value close to the minimum value in the range in which the value of δ is variable, the value of the skew may be changed in a preferable direction, so that the value of the skew is assumed to change in a direction in which the Q value is increased. Therefore, since the monitor value Q is or smaller than the Qpre where the Q value is fully increased, the loop in which the value of δ is increased is ended at that time (YES in Operation A5).

By controlling the value of δ as described above, the compensation amount controller 7 (the phase shift normalization unit 8) may optimize the IQ skew amount where the phase shift amount of the phase controller 6c-i is the Q value as an optimum value.

Figure 7:
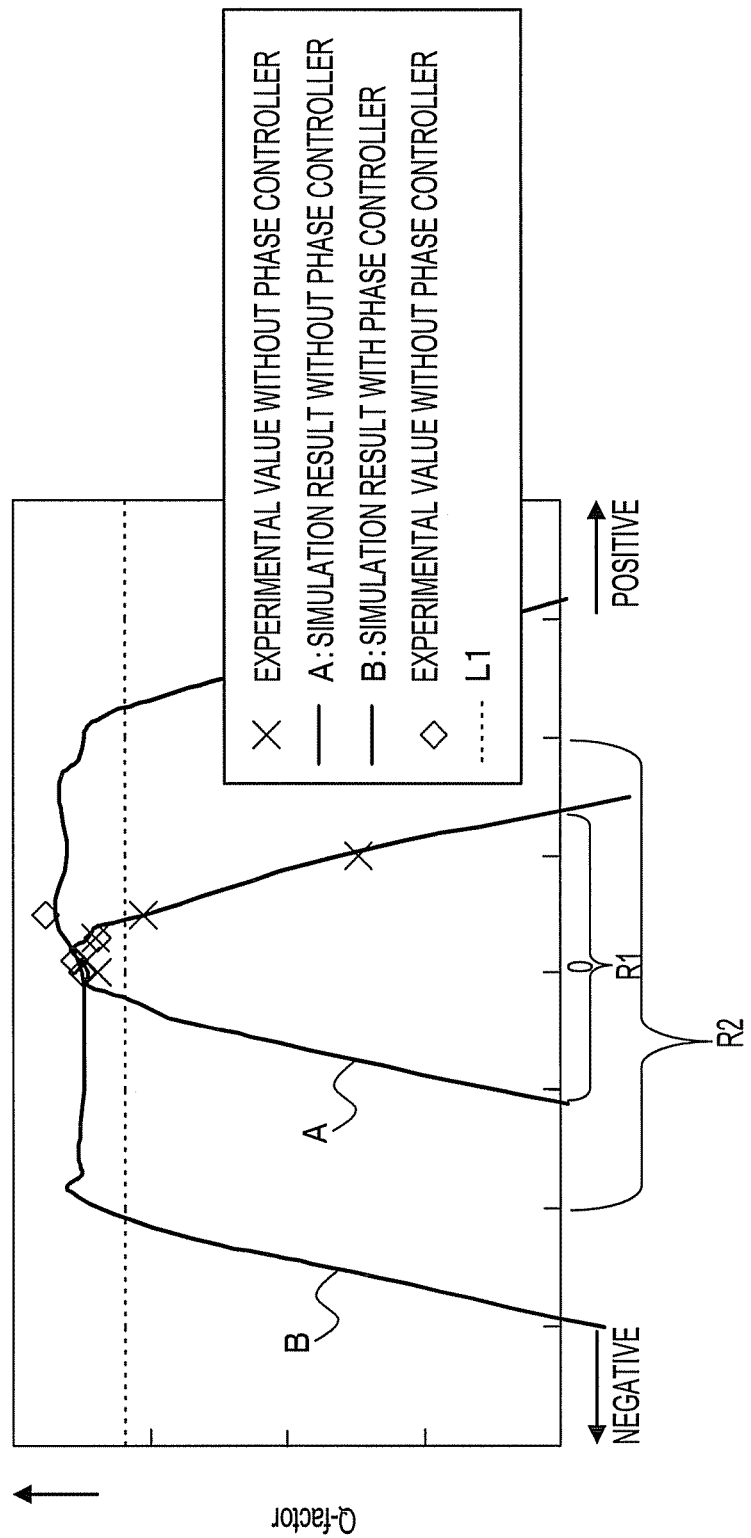
FIG. 7 illustrates an effect of the optical receiving device.

Line A in FIG. 7 illustrates an example of a simulation result with respect to the margin permitted by the skew between the input digital signals of each channel by the compensation of the IQ skew in the optical receiving device 10 according to the embodiment. Line B in FIG. 7 illustrates the simulation result of a case of the optical receiving device 1 having the DSP 6 (see FIG. 1) that does not have a function for compensating the skew.

As illustrated with Line B in FIG. 7, in the DSP 6 that does not have the function for compensating the skew of the sampling data, the margin permitted in the skew between the input digital signals of each channel is desired to reach a severe level to have the desired quality of the reproduced data. For example, if a Q factor, which is substantially equal to that of L1 in FIG. 7, is the desired quality, the margin of the IQ skew is smaller than at least the range of R1.

On the other hand, as illustrated with Line A in FIG. 7, in a case of the optical receiving device 10 (see FIG. 3) having the function for compensating the IQ skew, the margin, which is permitted by the skew between the input digital signals of each channel, may be larger than the case of Line B in FIG. 7. For example, if the above-described Q factor that is substantially equal to that of L1 is the desired quality, the margin for the IQ skew is increased to a range exceeding R2 that is larger than at least R1.

The above-described simulation result is obtained when the chromatic dispersion amount of the transmission line is set to a given amount and when delay is given only to a signal of one channel out of the signals of four channels. Even when the chromatic dispersion amount of the transmission line is another value or when the signal of two or more channels are delayed, the similar skew margin may be obtained by installing the function (phase controller 6c-i) for performing the skew compensation on the DSP 16.

The phase controller 6c-i and the data recovery unit 6a are integrally provided in the DSP 16. Thus, there is no necessity to consider a skew or the like generated by wiring between the phase controller 6c-i and the data recovery unit 6a compared to a case where the function of the phase controller 6c-i is provided outside the DSP 16. This makes it possible to reduce a device scale and to facilitate system design. Since the phase controller 6c-i is provided at the pre-stage of the data recovery unit 6a, data recovery processing is able to be performed on the signal after the affect of the skew is compensated in the data recovery unit 6a. This may improve the signal quality.

As described above, the embodiment has an advantage that it is possible to compensate the skew, generated on the path of each channel between the optical front end unit and the DSP performing processing on the digital signal.

The embodiment has another advantage that it is possible to increase the margin of the skew, which maintains the quality of the signal reproduced by the DSP 16, with respect to the digital signal corresponding to each channel signal that is input to the DSP 16.

Figure 9:
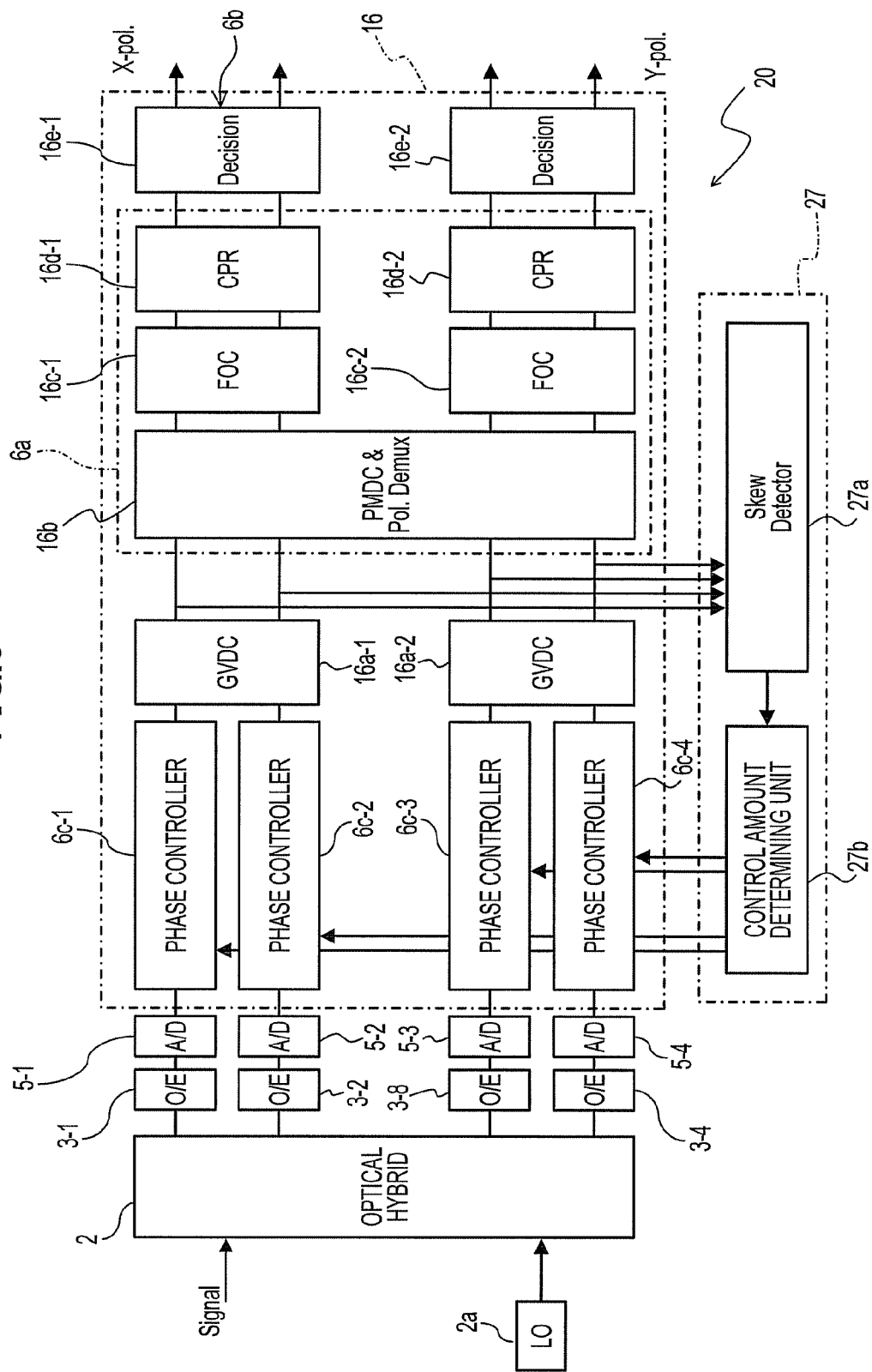
FIG. 9 illustrates the optical receiving device.
Figure 10:
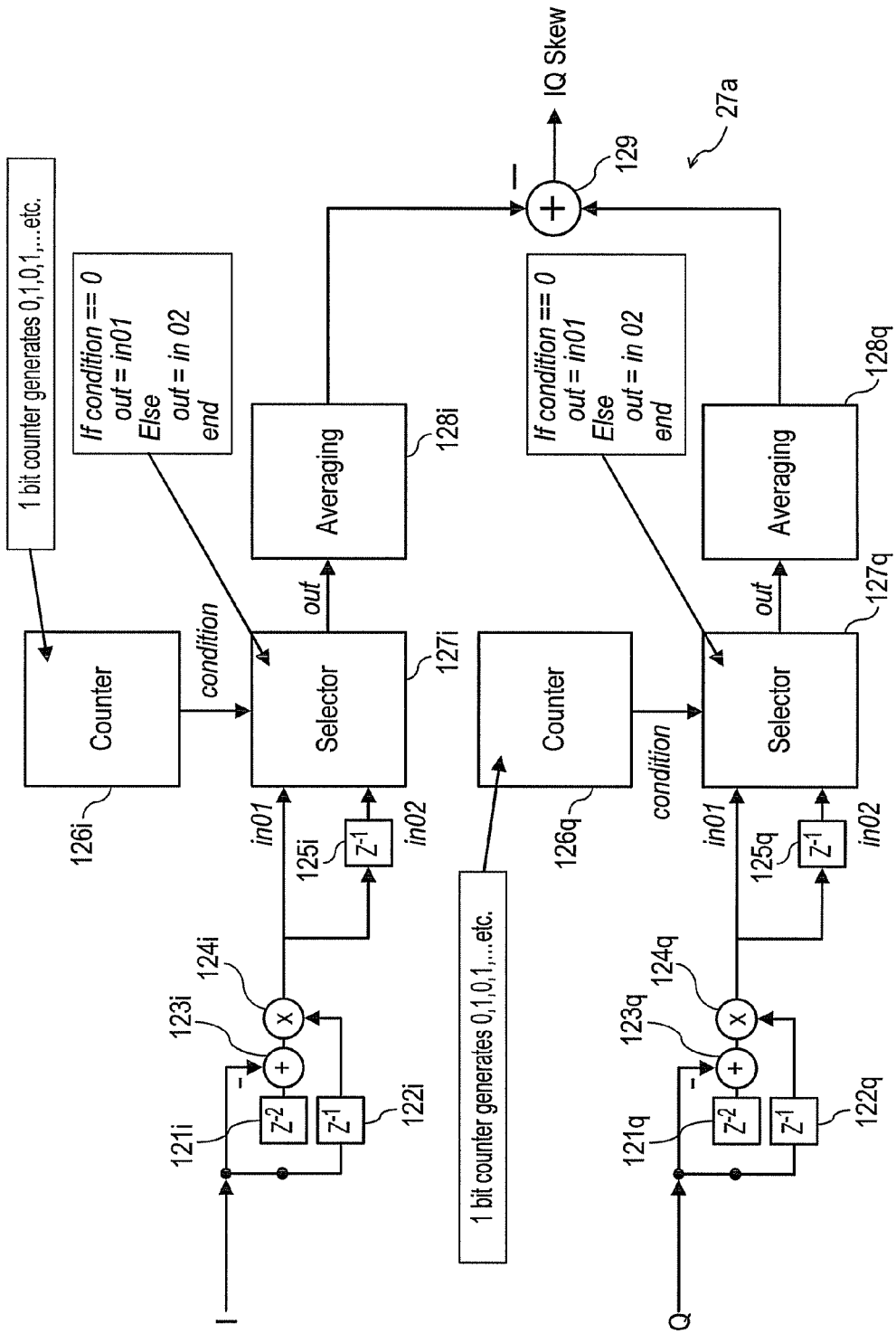
FIG. 10 illustrates an example of a skew detector of the optical receiving device.

FIG. 9 illustrates an optical receiving device 20.

A control amount provider 27 gives the control amount in the phase controller 6c-i based on the output of the phase controller 6c-i and includes a skew detector 27a and a control amount determining unit 27b.

Since the control amount provider 27 receives the polarization-multiplexed optical signal, the skew detector 27a and the control amount determining unit 27b may be provided separately for compensation of the IQ skew in each polarization component. The control amount provider 27 may be realized in any of hardware, firmware, or software.

On the other hand, when focusing on detection of the IQ skew of one of the polarization components, the skew detector 27a detects a skew remaining between the I signal and the Q signal that are output from the phase controller 6c-i and whose group velocity dispersion is compensated by the GVDC 16a-1 (or 16a-2). The control amount determining unit 27b determines the control amount of the phase controller 6c-i by using the detection result of the skew from the skew detector 27a and then outputs the control amount to the phase controller 6c-i.

According to the equation (8) described below, the skew detector 27a detects a skew between the I signal and the Q signal (IQ skew). At this time, data I (n) indicates sampling data of the I signal in the number of n from the GVDC 16a-1 (or 16a-2), and data Q (n) indicates sampling data of the Q signal in the number of n from the GVDC 16a-1 (or 16a-2). Therefore, the value inside the brackets added to the data I and the data Q corresponds to the value with one tap before the number of n if the value is n−1, and corresponds to the value with two taps before the number of n if the value is n−2. Furthermore, average (x) indicates averaging of x.

$$IQ\ \text{skew}=\text{average}((\text{data } Q(n-2)-\text{data } Q(n))\cdot \text{data } Q(n-1))-\text{average}((\text{data } I(n-2)-\text{data } I(n))\cdot \text{data } I(n-1)) \quad (8)$$

Therefore, the skew detector 27a equivalently includes 2-tap delay units 121i and 121q, 1-tap delay units 122i, 122q, 125i, and 125q, adders 123i and 123q, multipliers 124i and 124q, counters 126i and 126q, selectors 127i and 127q, averaging circuits 128i and 128q, and an adder 129.

That is, the skew detector 27a has mutually corresponding configuration elements to calculate the average value based on the I signal and the Q signal. Description will be made below of a configuration for averaging the I signal. The same description may be made of the configuration for averaging the Q signal.

Here, the 2-tap delay unit 121i, the 1-tap delay unit 122i, the adder 123i, and the multiplier 124i calculate (dataI(n−2)−dataI(n))·data(n−1).

A counter (one-bit counter) 126i outputs one-bit alternation signals "1," "0," "1," etc. synchronized to a sampling clock. At this time, when the counter 126i outputs "1," the selector 127i outputs the corresponding calculation result as is, which does not go through the delay device 125i, to the averaging circuit 128i. On the other hand, if the counter 126i outputs "0," the selector 127i outputs the corresponding calculation result, which goes through the delay unit 125i, to the averaging circuit 128i.

The averaging circuit 128i derives a subtracting term in the equation (8) by averaging the above-described calculation results at the present time and the state with one tap before. In the same manner, the averaging circuit 128q derives a subtracted term in the equation (8). Accordingly, the adder 129 calculates a difference between the above-described two terms and then outputs the difference as a detection value of the IQ skew.

The IQ skew detected as described above is input to the control amount determining unit 27b. Based on the IQ skew detected by the skew detector 27a, the control amount determining unit 27b performs setting control on the coefficient of the corresponding phase controller 6c-i.

Figure 11:
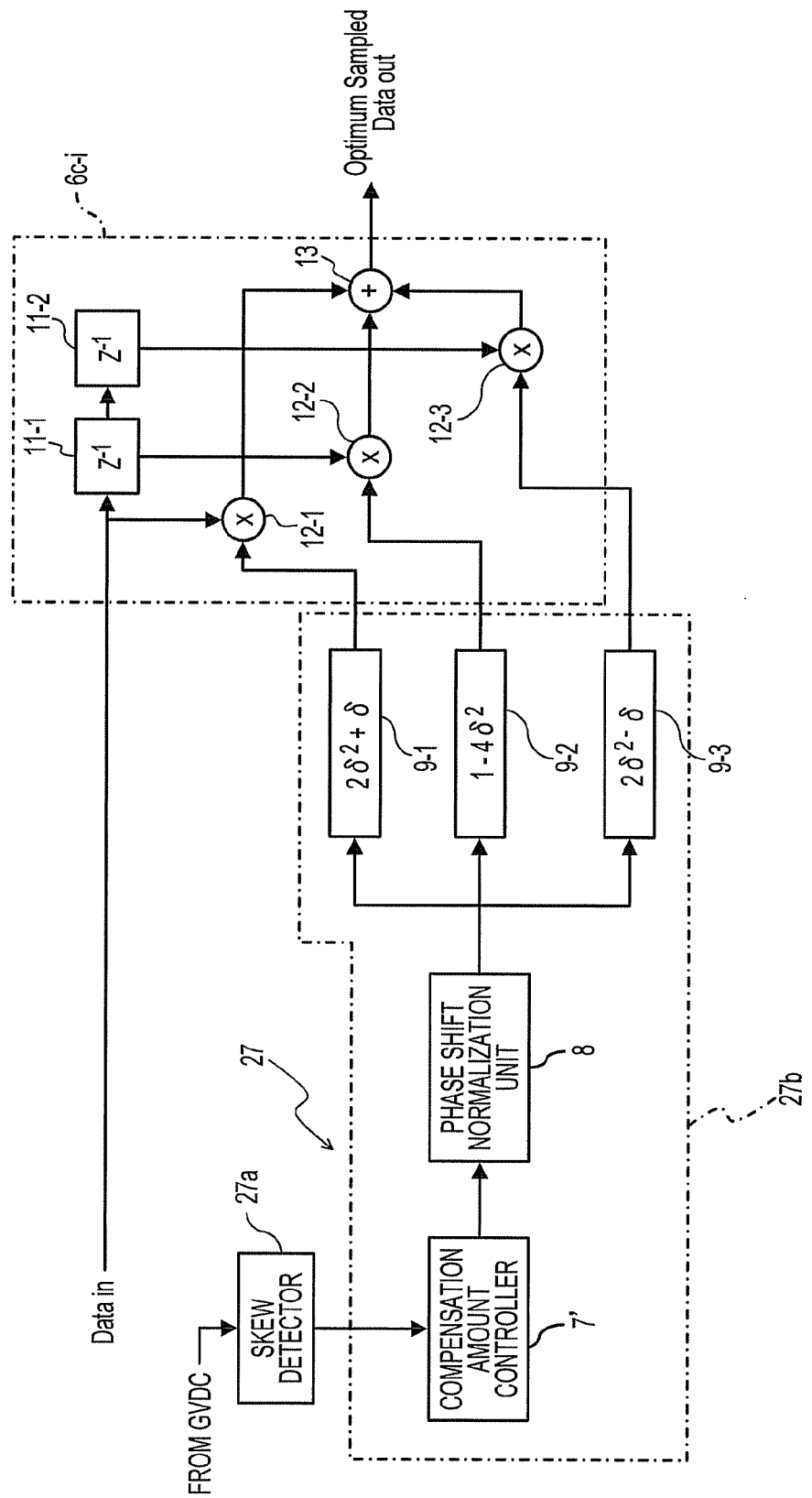
FIG. 11 illustrates an example of a control amount provider of the optical receiving device.

Here, when focusing on the compensation function of the IQ skew on one channel signal, the control amount determining unit 27b equivalently has the configuration illustrated in FIG. 11. That is, the control amount determining unit 27b includes a compensation amount controller 7' corresponding to the numeral 7 in FIG. 4, and also includes the phase shift normalization unit 8 and coefficient calculators 9-1 to 9-3 that are similar to those in FIG. 4.

The compensation amount controller 7' obtains a phase shift amount that is to be compensated from the value of the IQ skew detected by the skew detector 27a. That is, the value of the IQ skew detected by the skew detector 27a is subtracted to be the phase shift amount to be compensated (or the phase difference between the I signal and the Q signal). Therefore, a control parameter A, which is used to convert the amount of the detected IQ skew into the phase shift amount by multiplication, is set.

Figure 12:
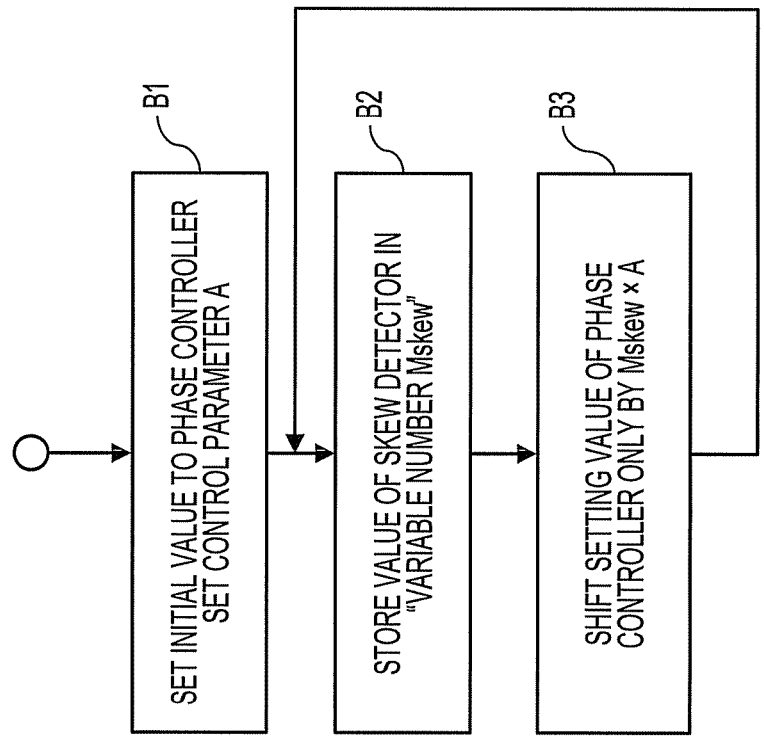
FIG. 12 illustrates operations of the optical receiving device.

FIG. 12 is a flowchart illustrating an example of coefficient setting in the control amount provider 27. The control amount determining unit 27b of the control amount provider 27 sets the coefficient of the initial value for each phase controller 6c-i. For example, the compensation amount controller 7' and the phase shift normalization unit 8 set the initial value of δ for coefficient derivation in the coefficient setting units 9-1 to 9-3. Then the control parameter A, which is used to obtain the phase shift amount in the compensation amount controller 7' from the detected value of the IQ skew, is set (Operation B1).

When the coefficient in the phase controller 6c-i is set to the initial value, the skew detector 27a detects the IQ skew at that time and then outputs the detection result to the compensation amount controller 7' of the control amount determining unit 27b. The compensation amount controller 7' stores the value of the above-described detection result in the storage area of a variable number Mskew (Operation B2). A storage area for the variable number Mskew may be provided inside or outside the compensation amount controller 7'.

Next, as for the phase shift amount to be set in the phase controller 6c-i, the compensation amount controller 7' multiplies, by the control parameter A, the Mskew stored in the storage area to obtain δ according to the multiplication result Mskew×A in the phase shift normalization unit 8. This δ is used for the coefficient derivation in the coefficient setting units 9-1 to 9-3. Accordingly, the filter coefficient of the phase controller 6c-i may be set by the coefficient setting units 9-1 to 9-3 (Operation B3).

In the same manner, the skew detector 27a detects the IQ skew value, multiplies the detected IQ skew value by the control parameter A, and obtains the phase shift amount to be reflected in the coefficient setting by the phase controller 6c-i (Operation B3 to Operation B2). Consequently, the IQ skew amount is optimized.

As described above, the present embodiment has an advantage that it is possible to compensate a skew generated on a path of each channel between the optical front end unit and the DSP unit that performs processing on the digital signals.

The present embodiment has another advantage that it is possible to increase the margin of the skew, which maintains the quality of the signal reproduced by the DSP 16, with respect to the digital signal corresponding to each channel signal to be input to the DSP 16.

Figure 13:
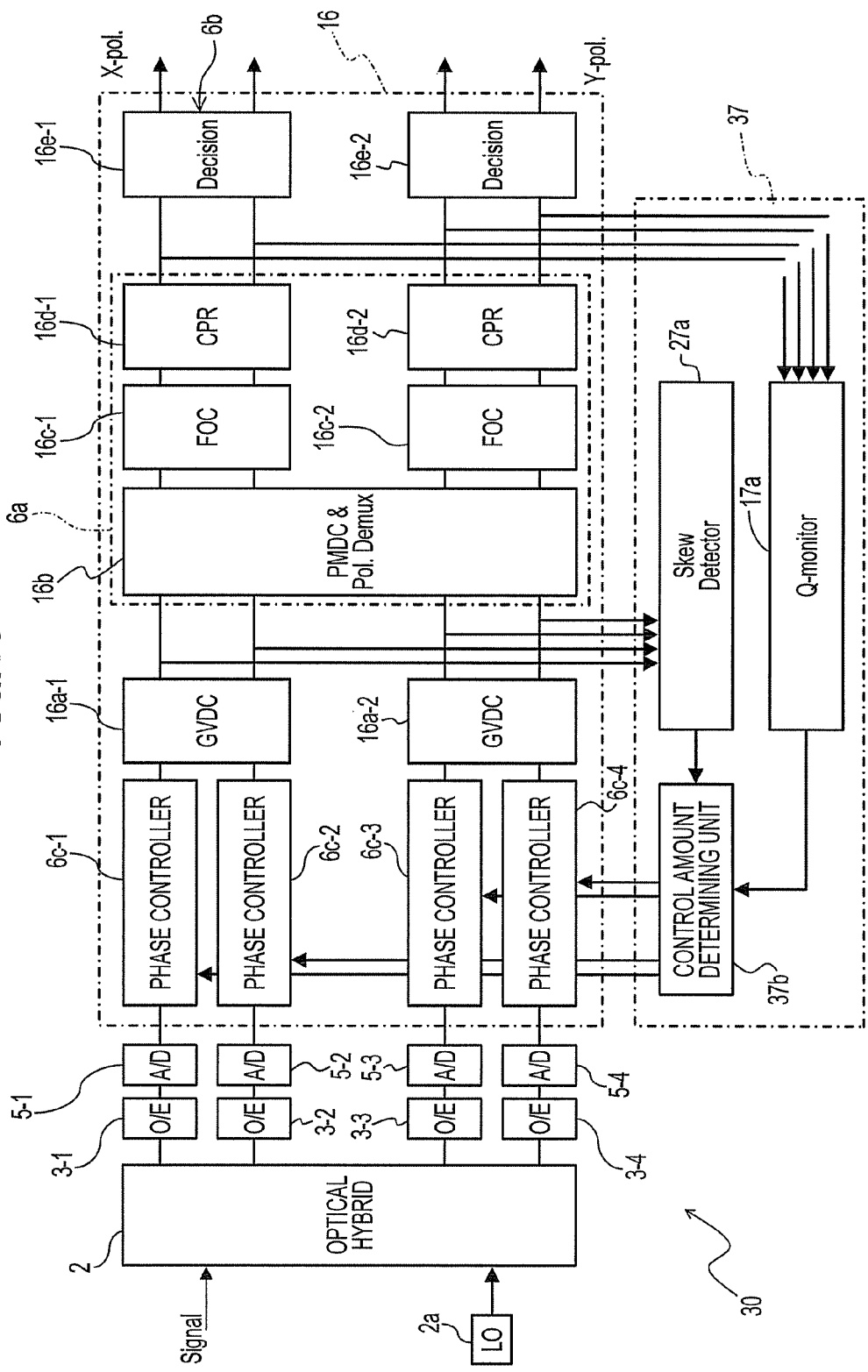
FIG. 13 illustrates the optical receiving device.

FIG. 13 illustrates an optical receiving device 30. Compared to the optical receiving devices 10 and 20 (see FIG. 3 and FIG. 9) according to the first and second embodiments, the optical receiving device 30 illustrated in FIG. 13 has a different configuration for a control amount provider 37. Other elements of the optical receiving device 30 are basically the same as those of the optical receiving devices 10 and 20. The same numerals indicate the same parts thereof.

In this case, the control amount provider 37 includes a Q monitor 17a, a skew detector 27a, and a control amount determining unit 37b. By using the result of monitoring by the Q monitor 17a and the detection result of the skew by the skew detector 27a, the control amount determining unit 37b determines the control amount for the phase controller 6c-i and then outputs the control amount to the phase controller 6c-i.

Figure 14:
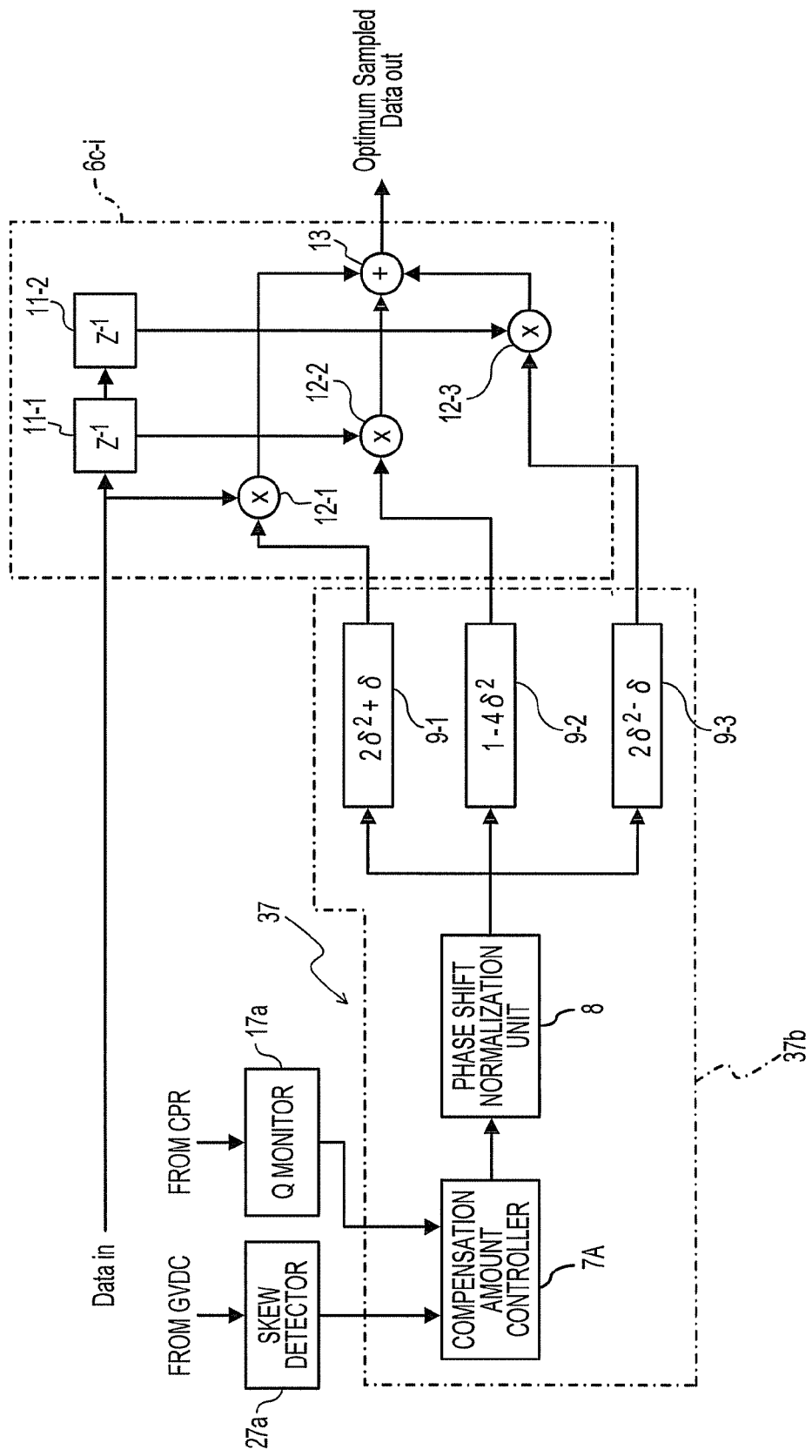
FIG. 14 illustrates an example of the control amount provider in the optical receiving device.

At this time, when focusing on the compensation function of the IQ skew in one of the polarization component, the control amount determining unit 37b equivalently has the configuration illustrated in FIG. 14. That is, the control amount determining unit 37b includes a compensation amount controller 7A corresponding to each the numerals 7 and 7' in FIG. 11 and also includes the phase shift normalization unit 8 and the coefficient calculators 9-1 to 9-3 that are similar to those in FIG. 4.

Figure 15:
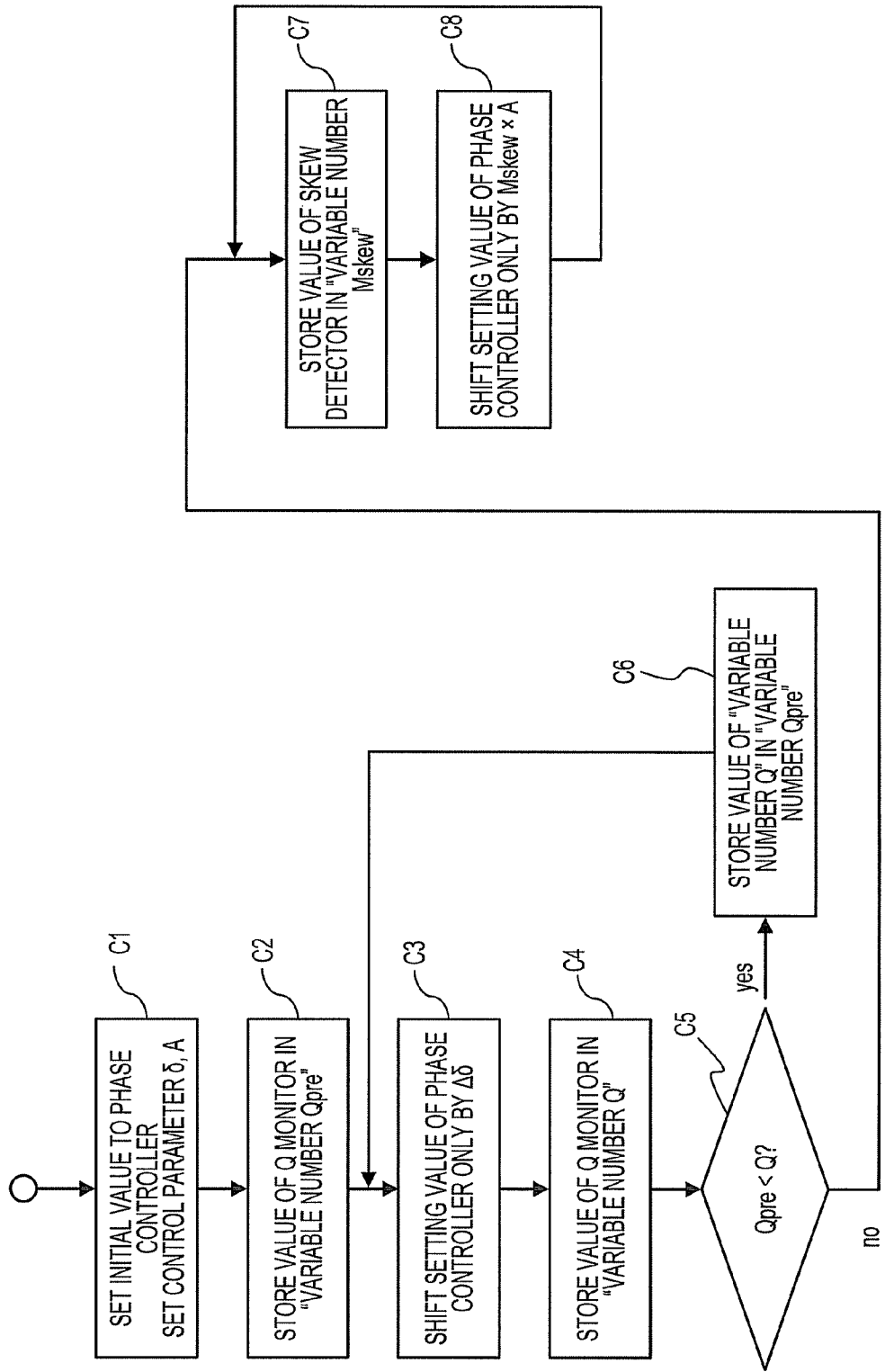
FIG. 15 illustrates operations of the optical receiving device.

The compensation amount controller 7A has a combination of the Q value monitored by the Q monitor 17a and the value of the IQ skew detected by the skew detector 27a and obtains the phase shift amount that is to be compensated. With reference to the flowchart in FIG. 15, description will be made of an example of the coefficient setting in the control amount provider 37.

The control amount determining unit 37b of the control amount provider 37 sets the coefficient of the initial value for each phase controller 6c-i. For example, as illustrated in FIG. 14, the compensation amount controller 7A and the phase shift normalization unit 8 set the initial value of δ for the coefficient derivation by the coefficient setting units 9-1 to 9-3. The control parameter A, which is used to obtain the phase shift amount in the compensation amount controller 7A from the detected value of the IQ skew, is set (Operation C1). The above-described initial value of δ may be close to the minimum value or the minimum value within a range in which the value of δ is variable.

When the coefficient of the phase controller 6c-i is set to the initial value, the control amount determining unit 37b performs coefficient control by using the monitor value from the Q monitor 17a. That is, the Q monitor monitors the Q value (Qx, Qy) at that time and outputs the monitor result to the compensation amount controller 7 of the control amount determining unit 17b. The compensation amount controller 7 stores the Q value of the above-described monitor result in the storage area of the variable number Qpre (Operation C2).

In the compensation amount controller 7A, with respect to the coefficient setting of the corresponding phase controller 6c-i, the value of δ for the coefficient derivation is shifted by the coefficient setting units 9-1 to 9-3 only by Δδ (Operation C3).

If the coefficient in the phase controller 6c-i is changed by the change of δ described above, the Q monitor 17a monitors the Q value (Qx, Qy) at that time and then outputs the monitoring result to the compensation amount controller 7A of the control amount determining unit 37b. The compensation amount controller 7A stores the Q value of the above-described monitor result in the storage area of the variable number Q (Operation C4). The above-described storage area of the variable numbers Qpre and Q may be provided inside or outside the compensation amount controller 7A.

The compensation amount controller 7A compares the sizes of the Qpre and the Q stored in the above-described storage area (Operation C5). If the Q as the monitor value, obtained when the value of δ is shifted, is larger than the Qpre as the initial coefficient value (YES in Operation C5), the δ is shifted in the same direction as in the previous time to continue searching for the optimum value. That is, the value of the variable number Q is stored as the variable number Qpre (Operation C6), and the value of δ for compensation derivation is shifted only by Δδ in the same direction as in the previous time, and Q value measurement is performed by the Q monitor 17a (from Operation C6 to Operation C3 and Operation C4).

On the other hand, the value Q as the monitoring value, obtained when the value of δ is shifted, is equal to or smaller than the Qpre (NO in Operation C5), the control amount determining unit 37b is shifted to the coefficient control using the monitoring value from the skew detector 7a.

That is, the skew detector 27a detects the IQ skew obtained when the value of δ is shifted and then outputs the detection result to the compensation amount controller 7A of the control amount determining unit 37b. The compensation amount controller 7A stores the value of the above-described detection result in the storage area of the variable number Mskew (Operation C7). The above-described storage area of the variable number Mskew may be provided inside or outside the compensation amount controller 7A.

As for the phase shift amount to be set in the phase controller 6c-i, the compensation amount controller 7A multiplies the Mskew stored in the storage area by the control parameter A to obtain δ according to the multiplication result Mskew×A in the phase shift normalization unit 8. As described above δ may be used for the coefficient derivation by the coefficient setting units 9-i and 9-3. Accordingly, the filter coefficient in the phase controller 6c-i may be set by the coefficient setting units 9-i and 9-3 (Operation C8).

In the same manner, the skew detector 27a detects the IQ skew value, multiplies the detected IQ skew by the control parameter A, and obtains the phase shift amount to be reflected in the coefficient setting in the phase controller 6c-i (Operation C8 to Operation C7). Consequently, the IQ skew amount is optimized.

As described above, the present embodiment has an advantage that it is possible to compensate a skew that is generated on a path of each channel between the optical front end unit and the DSP unit performing processing on digital signals.

The present embodiment has another advantage in that it is possible to increase the margin of the skew, which maintains the quality of the signal to be reproduced by the DSP 16, with respect to the digital signal corresponding to each channel input to the DSP 16.

Figure 16:
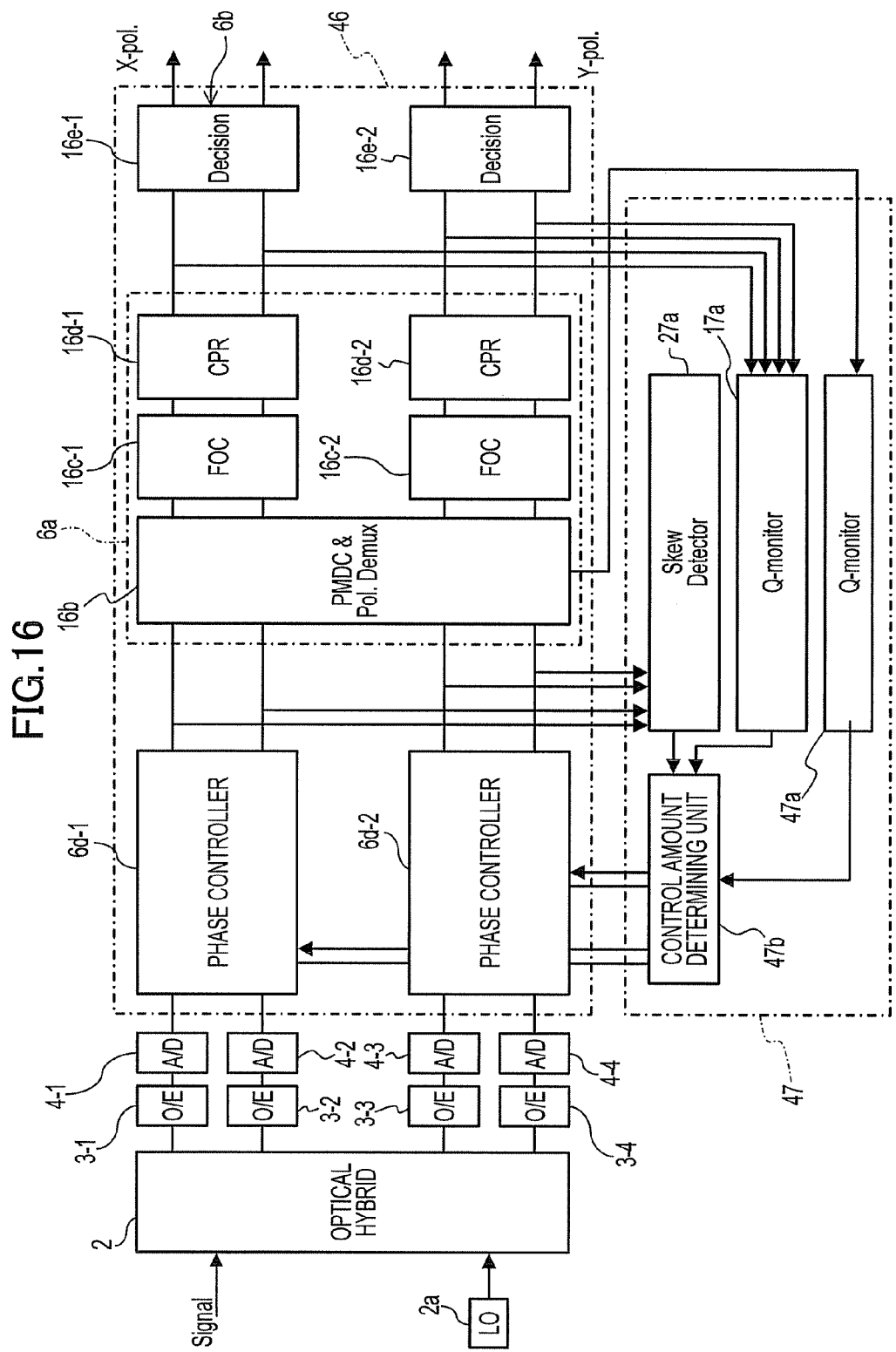
FIG. 16 illustrates the optical receiving device.

Compared to the above-described optical receiving device 30 illustrated in FIG. 13, an optical receiving device 40 illustrated in FIG. 16 has a configuration having functions of the phase controller 6c-i and the GVDCs 16a-1, 16a-2 and has a different configuration for a control amount provider 47.

That is, the optical receiving device 40 includes the DSP 46 that is different from that in FIG. 13. The optical receiving device 40 includes the signal processing units 6d-1 and 6d-2 in place of the above-described phase controller 6c-i and the GVDCs 16a-1 and 16a-2. The control amount provider 47 is added with a function.

The signal processing unit 6d-1 is an integration of functions of the phase controllers 6c-1 and 6c-2 and the GVDC 16a-1 for compensating group velocity dispersion on the X polarization component. The signal processing unit 6d-2 is an integration of functions of the phase controllers 6c-3 and 6c-4 and the GVDC 16a-2 for compensating the group velocity dispersion on the X polarization component.

The signal processing units 6d-1 and 6d-2 may be the FIR filter having N taps respectively as illustrated in FIG. 8. That is, as described in the equation (9), a transfer function Htotalx (ω) of a filter that the signal processing unit 6d-1 has may indicate that the transfer function as the phase controllers 6c-1, 6c-2, and the GVDC 16a-1 is superimposed. In the same manner, as described in the equation (10), a transfer function Htotaly (ω) of the filter that the signal processing unit 6d-2 has may indicate that the transfer function as the phase controllers 6c-3, 6c-4, and the GVDC 16a-2 is superimposed.

In the following equations (9) and (10), HGVDCx (ω) and HGVDCy are transfer functions corresponding to the GVDCs 16a-1 and 16a-2 illustrated in FIG. 13, respectively. Furthermore, HPSx is a transfer function used to compensate the IQ skew in the phase controllers 6c-1 and 6c-2 illustrated in FIG. 13. For example, HPSx may be a transfer function that the phase controller 6c-2 has when the coefficient of the phase controller 6c-1 is fixed and the coefficient of the phase controller 6c-2 is varied. In the same manner, HPSy is a transfer function used to compensate the IQ skew in the phase controllers 6c-3 and 6c-4 illustrated in FIG. 13.

By adding the filter coefficient to the signal processing units 6d-1 and 6d-2 as the above-described FIR filter, the control amount provider 47 compensates the IQ skew and the GVDC. Accordingly, the control amount provider 47 includes a Q monitor 17a, a skew detector 27a, a GVD monitor 47a, and a control amount determining unit 47b.

The GVD monitor 47a monitors the value (GVDx, GVDy) of the group velocity dispersion for each of the X polarization component and the Y polarization component from the output of the PMDC 16b.

Furthermore, based on the monitor value of the group velocity dispersion with respect to the X polarization component from the GVD monitor 47a, the control amount determining unit 47b performs the compensation amount control of the group velocity dispersion according to the transfer function HGVDCx (ω) through the setting of the filter coefficient in the signal processing unit 6d-1. In the same manner, based on the monitor value of the group velocity dispersion on the Y polarization component from the GVD monitor 47a, the control amount determining unit 47b performs the compensation amount control of the group velocity dispersion according to the transfer function HGVDCy (ω) through the setting of the filter coefficient to the signal processing unit 6d-2.

The control amount determining unit 47b performs the compensation control of the IQ skew of the X polarization component through the setting of the filter coefficient to the signal processing unit 6d-1. Furthermore, the control amount determining unit 47b performs the compensation control of the IQ skew of the Y polarization component through the setting of the filter coefficient to the signal processing unit 6d-2.

Specifically, the compensation of the IQ skew is performed by setting the filter coefficient to the signal processing units 6d-1 and 6d-2 by using the Q value (Qx, Qy) monitored by the Q monitor 17a together with the detection value of the IQ skew of each polarization component detected by the skew detector 27a.

In other words, the control amount determining unit 47b may perform the compensation of the IQ skew with respect to the X polarization component and of the group velocity dispersion through the setting of the filter coefficient to the signal processing unit 6d-1, and may perform the compensation of the IQ skew with respect to the Y polarization component and of the group velocity dispersion through the setting of the filter coefficient to the signal processing unit 6d-2. Therefore, the signal processing units 6d-1 and 6d-2 are an example of the phase controller and may be an example of the data recovery unit that includes the PMDC 16b, the FOCs 16c-1 and 16c-2, and the CPRs 16d-1 and 16d-2.

Modifications of the Embodiments

Although the embodiments of the present invention have been described in detail, it should be understood that the various changes, substitutions, and alternations could be made hereto without departing from the spirit and scope of the embodiments.

For example, according to the above-described embodiments, as for the polarization-multiplexed optical signal, the IQ skew with respect to the X polarization component and the Y polarization component is compensated individually. Optical coherent reception may be performed on optical signals without polarization multiplexing.

Furthermore, according to the above-described embodiment, processing for compensating the differential between the X polarization component and the Y polarization component may be added at the pre-stage of the control for compensation of the IQ skew of each polarization component.

For example, by using the flowchart illustrated in FIG. 17, description will be made of processing in the above-described optical receiving device 10. The control amount determining unit 17b of the control amount provider 17 sets the coefficient of the initial value for each phase controller 6c-i. In this case, the initial value of the differential between the X polarization component and the Y polarization component is set to δD, the initial value to optimally compensate the IQ skew of the X polarization component is set to δx, and the initial value to optimally compensate the IQ skew of the Y polarization component is set to δy (Operation D1).

Figure 17:
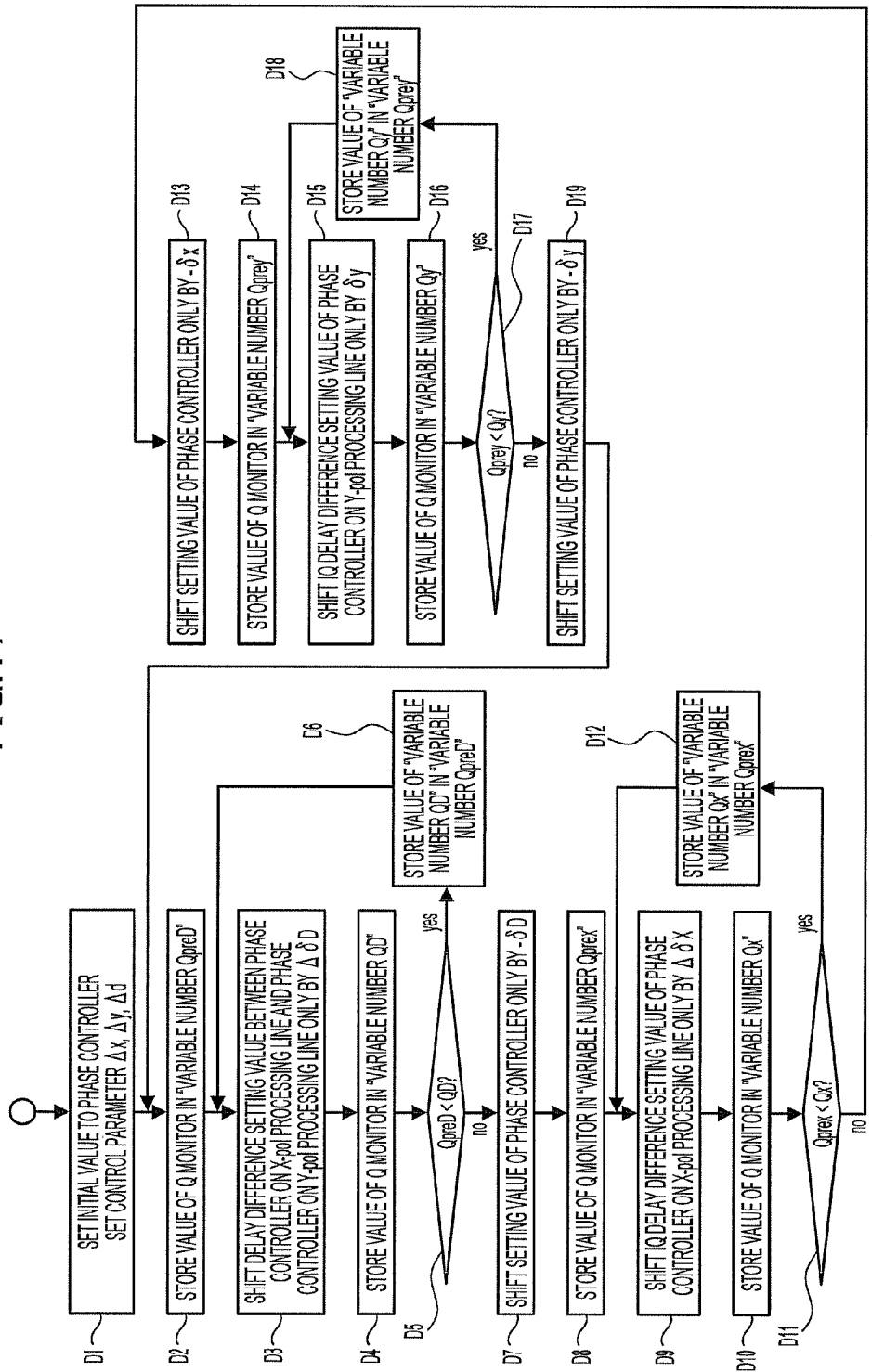
FIG. 17 illustrates operations of the optical receiving device.

As illustrated in FIG. 17, the control amount provider 17 performs the control for the compensation of the differential between the X polarization component and the Y polarization component (Operation D2 to Operation D7), and sequentially controls the compensation of the IQ skew in the X polarization component and the Y polarization component (Operation D8 to Operation D19). The control is not limited to the sequence described in FIG. 17 and may be performed in another order.

The value δD is the initial value of the differential between the phase shift amount with respect to the phase controllers 6c-1 and 6c-2 and the phase shift amount with respect to the phase controllers 6c-3 and 6c-4. For example, it is assumed that the compensation of the IQ skew of each polarization component is performed through the control of the coefficient of the phase controllers 6c-2 and 6c-4 with respect to the Q signal.

In this case, as the initial setting value for the coefficient derivation, δ=0 in the phase controller 6c-1 and δ=δx in the phase controller 6c-2 are given through the compensation amount controller 7 and the phase shift normalization unit 8 that are comprising the control amount determining unit 17b (see FIG. 4). In the same manner, as the initial set value for the coefficient derivation, δ=δD is added in the phase controller 6c-3, and δ=δy+δD is added in the phase controller 6c-4, respectively. The control for compensation of the differential between the X polarization component and the Y polarization component is not limited to the disclosed embodiments.

The Q monitor 17a monitors the Q value (Qx, Qy) in the above-described case of δ setting. The compensation amount controller 7 stores, in the storage area, the average value of Qx, the monitored Q value of the X polarization component, and Qy, the monitored Q value of the Y polarization component as "variable number QpreD" (Operation D2). This storage area may be provided inside or outside the compensation amount controller 7.

The compensation amount controller 7 shifts the delay difference set value between the phase controllers 6c-1 and 6c-2 on the Q polarization processing line and the phase controllers 6c-3 and 6c-4 on the Y polarization processing line only by ΔδD (Operation D3). For example, right after the setting of the initial value, the setting of δ of the phase controllers 6c-1 and 6c-2 is maintained as it is, and δ=δD+ΔδD is given in the phase controller 6c-3 and δ=δy+δD+ΔδD is given in the phase controller 6c-4.

The Q monitor 17a monitors the Q value (Qx, Qy) when the above-described δ setting is changed. The compensation amount controller 7 stores the average value of the monitored Q value, Qx, with respect to the X polarization component and the monitored Q value, Qy, with respect to the Y polarization component as "variable number QD" in the storage area (Operation D4). The storage area of the QpreD and the QD may be provided inside or outside the compensation amount controller 7.

The compensation controller 7 compares the sizes of the variable numbers QpreD and QD stored in the above-described storage area (Operation D5). If the QD as the monitor value, obtained when the value of δ is shifted, is larger than the QpreD (YES in Operation D5), the compensation controller 7 continues searching for the optimum value by further shifting the value of δ only by ΔδD on the Y polarization processing line. That is, the value of the variable number QD is updated and stored as the variable number QpreD (Operation D6), and the value of δ for the coefficient derivation is further shifted only by ΔδD, so that the Q monitor 17a performs the Q value measurement (from Operation D6 to Operation D3 and Operation D4).

The above-described processing is repeated until the QD, as the monitor average value obtained when the value of δ on the Y polarization processing line is shifted, is equal to or smaller than the above-descried QpreD. If the QD is equal to or smaller than the QpreD (NO in Operation D5), the setting of δ on the Y polarization processing line is shifted only by −ΔδD to return the value to the previous value. The filter coefficient setting of each phase controller 6c-i corresponds to the filter coefficient setting for optimally compensating the differential between the X polarization component and the Y polarization component.

With reference to Operation A2 to Operation A7 in FIG. 6, in the control amount provider 17, the filter coefficients in the phase controllers 6c-1 and 6c-2 on the X polarization processing line are given through the setting of δ. This makes it possible to set the filter coefficients in the phase controllers 6c-1 and 6c-2 so that the IQ skew may be compensated to become an optimum value for the X polarization component (Operation D7 to Operation D13).

In the same manner as the setting of the filter coefficients of the phase controllers 6c-1 and 6c-2 for the X polarization component, in the control amount provider 17, the filter coefficients in the phase controllers 6c-3 and 6c-4 are given through the setting of δ. This makes it possible to set the filter coefficients in the phase controllers 6c-1 and 6c-2 so that the IQ skew is optimally compensated with respect to the Y polarization component (Operation D14 to Operation D19).

Based on the result of the monitoring from the Q monitor 17a, the control amount determining unit 17b may repeat the control (Operation D2 to Operation D7) to compensate the differential between the X polarization component and the Y polarization component and may repeat the control (Operation D8 to Operation D19) for compensating the IQ skew in the X polarization component and the Y polarization component (Operation D19 to Operation D2).

The disclosed embodiments enable those skilled in the arts to produce the disclosed devices.

The word "compensation" used in the present specification does not mean complete compensation, but means determination of a range for compensation according to the following technical matters: waveform distortion, jitter, and noise included in a signal light; nonlinear optical effect, polarization mode dispersion amount, polarization crosstalk, and chromatic dispersion amount; and variation in manufacture of a product, error in approximate equations and the like used in a circuit, signal distortion on an electric circuit, and error of a control value.

Advantage of the Embodiments

According to the disclosed technique, the embodiments have an advantage that the skew is generated on a path of each channel between the optical front end unit and the processor performing processing on a digital electric signal.

The embodiments have another advantage in that it is possible to increase the margin of the skew, which maintains the quality of the signal to be reproduced by the processor, with respect to the digital electric signal corresponding to each channel signal that is to be input to the processor.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal processing device comprising:
   a phase controller configured to control respective phases of an in-phase signal and a quadrature signal which are obtained by converting an analog signal into a digital signal when a multi-value phase modulation light is demodulated, by digital signal processing; and
   a control amount provider configured to provide a control amount to the phase controller for skew compensation corresponding with the respective phases output by the phase controller, and
   wherein the control amount to be provided is determined in accordance with a monitoring result associated with a quality of reproduced data corresponding with the respective phases output by the phase controller.

2. The signal processing device according to claim 1, wherein the phase controller includes a processor which conducts digital signal processing.

3. The signal processing device according to claim 2, wherein the processor includes a data recovery unit which recovers data based on the in-phase signal and the quadrature signal whose phases are controlled by the phase controller.

4. The signal processing device according to claim 3, wherein the control amount provider includes a quality monitor which monitors a quality of reproduced data from an output from the data recovery unit, and a control amount determining unit which determines the control amount in the phase controller by using a monitoring result of the quality monitor and which outputs the control amount to the phase controller.

5. The signal processing device according to claim 1, wherein the control amount provider includes a skew detector which detects a skew remaining between the in-phase signal and the quadrature signal output from the phase controller, and a control amount determining unit which determines the control amount in the phase controller by using a detection result of the skew by the skew detector and which outputs the control amount to the phase controller.

6. The signal processing device according to claim 3, wherein the control amount provider includes:
   a quality monitor configured to monitor a quality of reproduced data from an output from the data recovery unit;
   a skew detector configured to detect a skew remaining between the in-phase signal and the quadrature signal output from the phase controller; and
   a control amount determining unit configured to determine the control amount in the phase controller by using the monitor result of the quality monitor and the detection result of the skew detected by the skew detector and which outputs the control amount to the control amount determining unit.

7. The signal processing device according to claim 3, wherein the phase controller is a finite impulse response filter having three or more taps.

8. The signal processing device according to claim 7, comprising a group velocity dispersion compensator which compensates a distortion caused by group velocity dispersion included in the multi-value phase modulation light, and wherein the phase controller and the group velocity dispersion compensation unit are included in a single finite impulse response filter.

9. The signal processing device according to any one of claims 1 to 8, wherein the control amount provider provides, to the phase controller, a control amount by which a skew between the in-phase signal and the quadrature signal is compensated by the phase control.

10. The signal processing device according to any one of claims 1 to 8, wherein the multi-value phase modulation light is a light which receives multi-value phase modulation on two polarization components that are mutually orthogonal, wherein the phase controller performs the phase control for each of the polarization components on at least either the corresponding in-phase signal or the quadrature signal, and wherein the control amount provider provides the control amount to the phase controller with respect to the in-phase signal and the quadrature signal obtained on each of the polarization components.

11. The signal processing device according to claim 10, wherein the control amount provider provides a control amount to compensate a skew generated between the in-phase signal and the quadrature signal obtained on each of the polarization components by the phase control, and a skew generated between the polarization components.

12. An optical receiving device comprising:
   a receiving unit configured to receive a multi-value phase modulation light and output an in-phase signal and a quadrature signal as an optical signal;
   a photoelectric converter configured to convert the in-phase signal and the quadrature signal output from the receiving unit each into an analog electric signal by photoelectric converting processing;
   an analog-to-digital converter configured to convert the in-phase signal and the quadrature signal of the analog electric signal each into a digital electric signal;
   a phase controller configured to control a phase of the in-phase signal and the quadrature signal which are each converted into the digital electric signal by the analog-to-digital converter;
   a processor configured to process data recovery on the in-phase signal and the quadrature signal which receive the phase control by the phase controller; and
   a control amount provider configured to provide a control amount to the phase controller for skew compensation corresponding with respective phases output by the phase controller, and
   wherein the control amount to be provided is determined in accordance with a monitoring result associated with a quality of reproduced data corresponding with the respective phases output by the phase controller.

13. A signal processing device comprising:
   a phase controller configured to control a phase of an in-phase signal and a quadrature signal which are each obtained by analog-to-digital conversion when a multi-value phase modulation light is demodulated, and
   a control amount provider configured to provide a control amount to the phase controller for skew compensation corresponding with respective phases output by the phase controller, and
   wherein the control amount to be provided is determined in accordance with a monitoring result associated with a quality of reproduced data corresponding with the respective phases output by the phase controller.

14. The signal processing device according to any one of claims 1 to 8,
   wherein the control amount provider provides, to the phase controller, a control amount by which a skew between the in-phase signal and the quadrature signal is compensated by the phase control, and
   wherein the multi-value phase modulation light is a light which receives multi-value phase modulation on two polarization components that are mutually orthogonal, wherein the phase controller performs the phase control for each of the polarization components on at least either the corresponding in-phase signal or the quadrature signal, and wherein the control amount provider provides the control amount to the phase controller with respect to the in-phase signal and the quadrature signal obtained on each of the polarization components.

* * * * *